(12) United States Patent
Haas et al.

(10) Patent No.: US 9,607,067 B2
(45) Date of Patent: Mar. 28, 2017

(54) SYNCHRONIZATION OF TIME BETWEEN DIFFERENT SIMULATION MODELS

(71) Applicant: International Business Machines Corporation, Armonk, NY (US)

(72) Inventors: Peter J. Haas, San Jose, CA (US); Yinan Li, San Jose, CA (US); Ronald Mak, San Jose, CA (US); Wang-Chiew Tan, San Jose, CA (US); Ignacio Terrizzano, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 445 days.

(21) Appl. No.: 13/750,789

(22) Filed: Jan. 25, 2013

(65) Prior Publication Data

US 2014/0214762 A1    Jul. 31, 2014

(51) Int. Cl.
*G06F 7/00* (2006.01)
*G06F 17/00* (2006.01)
(Continued)

(52) U.S. Cl.
CPC .. *G06F 17/30581* (2013.01); *G06F 17/30575* (2013.01)

(58) Field of Classification Search
CPC ...... G06F 17/5009; G06F 19/12; G06F 19/26; G06F 19/28; G06F 19/3437;
(Continued)

(56) References Cited

U.S. PATENT DOCUMENTS 6,609,085 B1    8/2003    Uemura et al.
7,027,516 B2    4/2006    Anderson et al.
(Continued)

FOREIGN PATENT DOCUMENTS

CN    102750309 A    10/2012
GB    2310118 A    8/1997
WO    2008024153 A2    2/2008

OTHER PUBLICATIONS

Cefkin, Melissa et al., "Splash: A Progress Report on Building a Platform for a 360 Degree View of Health", Proceedings of the 5th INFORMS Workshop on Data Mining and Health Informatics (DM-HI 2010), 6 pages.
(Continued)

*Primary Examiner* — Usmaan Saeed
*Assistant Examiner* — Cecile Vo
(74) *Attorney, Agent, or Firm* — Cantor Colburn LLP

(57) ABSTRACT

Embodiments relate to a method and computer program product for generating a composite simulated model. A method includes receiving a specification request for generating a set of target time-series data from a set of source time-series data and obtaining specification information relating to the set of source time-series data, obtaining specification information relating to the set of target time-series data, and obtaining the source time-series data. The method also includes comparing the source and target specification information to determine if the set of source time-series data are time-aligned with the set of target time-series data and converting the set of source time-series data to the set of target time-series data upon determination that time alignment is needed.

14 Claims, 21 Drawing Sheets

(51) Int. Cl.
*G06F 17/30* (2006.01)
*G06F 13/14* (2006.01)

(58) Field of Classification Search
CPC ......... G06F 17/30321; G06F 17/30598; G06F 17/3071; G06F 17/30516; G06F 17/30; G06F 17/30017; G06F 17/30056; G06F 17/30424; G06F 17/30539; G06F 17/30548; G06F 17/30575; G06F 17/30964; G06F 17/30581
USPC ..... 703/2, 6, 11, 22; 707/737, 759, E14.046, 707/E17.089, 769, E17.001, 705, 718, 707/758, 625
See application file for complete search history.

(56) References Cited

U.S. PATENT DOCUMENTS

| | | | |
|---|---|---|---|
| 7,194,394 B2 | 3/2007 | Dorfman et al. | |
| 7,421,380 B2 | 9/2008 | Thiesson et al. | |
| 7,631,319 B2 * | 12/2009 | Miller | G06F 9/5016 709/231 |
| 7,660,707 B2 | 2/2010 | Maruyama et al. | |
| 7,716,011 B2 | 5/2010 | Thibaux et al. | |
| 8,712,740 B2 | 4/2014 | Morio et al. | |
| 2002/0001795 A1 | 1/2002 | Bejar | |
| 2002/0023175 A1 | 2/2002 | Karlak | |
| 2007/0118041 A1 * | 5/2007 | Nishiura | G06T 7/20 600/508 |
| 2007/0147519 A1 | 6/2007 | Takayama et al. | |
| 2007/0157162 A1 | 7/2007 | Ciolfi | |
| 2007/0233435 A1 | 10/2007 | Bradski | |
| 2009/0030614 A1 | 1/2009 | Carnegie et al. | |
| 2009/0281839 A1 | 11/2009 | Lynn et al. | |
| 2010/0064275 A1 | 3/2010 | Akkiraju et al. | |
| 2011/0066411 A1 * | 3/2011 | Morio | G01H 3/00 703/2 |
| 2011/0066649 A1 | 3/2011 | Berlyant et al. | |
| 2011/0243271 A1 | 10/2011 | Takahashi et al. | |
| 2011/0283099 A1 | 11/2011 | Nath et al. | |
| 2011/0295774 A1 | 12/2011 | Chen et al. | |
| 2013/0290367 A1 * | 10/2013 | Kashiyama | G06F 17/30551 707/769 |
| 2014/0172503 A1 | 6/2014 | Hammerstrom et al. | |

OTHER PUBLICATIONS

Haas, Laura M. et al., "Clio Grows Up: From Research Prototype to Industrial Tool", SIGMOD Jun. 14-16, 2005, pp. 805-810.
Howe, Bill, "SciDB Examples from Environmental Observation and Modeling", Oregon Health & Science University Center for Coastal Margin Observation and Prediction, Nov. 19, 2008, 9 pages.
Howe, Bill and Maier, David, "Algebraic manipulation of scientific datasets", VLDB Journal (2005) 14(4): pp. 397-416.
Huang, Yun-Wu and Yu, Philip S., "Adaptive Query Processing for Time-Series Data", ACM 1999 1-58113-143-7/99/08, pp. 282-286.
Li, Yinan et al., "Data Exchange between Simulation Models: Getting the Time Right", IBM Research—Almaden, 25 pages.
Bergland, John et al., "Integrating Systems Through Universal Transformation Using IBM WebSphere Transformation Extender", Websphere Software, IBM Corp. 2009, 28 pages.
Hudson, M. et al., "Simplication of Semantically-Rich Model Transformations Through Generated Transformation Blocks", 2011 18th IEEE International Conference and Workshops on Engineering of Computer-Based Systems, pp. 261-268.
IBM, "Automated Ontological Mapping for Metadata", IP.com Publication IPCOM000191276D, publication date: Dec. 24, 2009, 5 pages.
Paige, C. C. et al., "Solution of Sparse Indefinite Systems of Equations and Least Square Problems", Database entry Copyright (c) Software Patent Institute, IPCOM000150589D, electronic publication Apr. 18, 2007, 50 pages.
Tan, Wang-Chiew et al., "Splash: A Platform for Analysis and Simulation of Health", IHI '12, Jan. 28-30, 2012, Miami FL, USA, 10 pages.
U.S. Appl. No. 13/750,751; Non-Final Office Action: filed Jan. 25, 2013; Date Mailed: Mar. 31, 2015; 17 pages.
U.S. Appl. No. 13/750,751; Notice of Allowance; filed Jan. 25, 2013; Date Mailed: Aug. 21, 2015; 9 sheets.
Cefkin et al; "Splash: A progress report on combining simulations for better health policy", (Extended Abstract), 2011, Informs Healthcare 2011, 2 pages.
Haas et al. "Data is Dead . . . Without What-if Models," 2011, Proceedings of the VLDB Endowment, vol. 4 No. 12, 4 pages.
Jaiali et al., "Multisimulations: towards next generation integrated simulation environments," Formal Actors, Open systems, Biological Systems, 2011, Springer-Verlag, pp. 352-367.
Peter J. Haas, "Composite simulation modeling of complex service systesm: example and reasearch challenges," 2011 Informs Simulation Socieity Research Workshop, 2011, 31 pages.

* cited by examiner

BMI.sadl

```
<Actor name="BMI Model" type = "model" model_type = "simulation"
    sim_type = "continuous-deterministic" owner="Jane Modeler">
    <Description>
    Predict weight change over time based on an individual's energy intake (food
    intake), sodium intake, and energy expenditure (physical activity). Implemented
    in C. reference: http://csel/asu.edu/?q=Weight
    </Description>
    <Environment>
        <Variable name="EXEC_DIR" default="/Splash"
            description="executable directory path"/>
        <Variable name="SADL_DIR" default="/Splash/SADL"
            description="schema directory path"/>
    </Environment>
    <Execution>
        <Command>$EXEC_DIR/Models/BMIcalc.out</Command>
        <Description>Run BMI model</Description>
    </Execution>
    <Arguments>
        <Input name="demographics" sadl="$SADL_DIR/BMIInput.sadl"
            description="demographics data"/>
        <Output name="people" sadl="$SADL_DIR/BMIOutput.sadl"
            description="people's daily calculated BMI"/>
    </Arguments>
    ..
</Actor>
```

FIG. 3

BMIInput.xsdl

```
<Actor name="BMIinput" type="data" data_type = "time_series">
  <Description>
    Metadata of input data file of the BMI model.
  </Description>
  <Time type="continuous" observations="regular" field="tick" unit="day" value="1">
  </Time>
  <Data>
    <Source mode="file" uri="$EXEC_DIR/Data/BMIinput.dat"/>
    <Schema type="xsd" uri="$SAPL_DIR/Schemas/BMIinput.xsd"/>
    <Format type="del" delimiter=","/>
  </Data>
  <Attributes>
    <name="tick" unit="day" factor="1", measurement-type="numerical"
      description = "simulation tick ID"
      measure-method="instant" missing-data="-1"/>
    <name="weight" unit="pound", factor="1" measurement-type="numerical"
      description = "weight measured before breakfast"
      measure-method="instant" missing-data="-1"/>
    <name="height" unit="inch" factor="1" measurement-type="numerical"
      description="height measured barefoot"
      measure-method="instant" missing-data="-1"/>
    <name="gender" measurement-type="categorical"
      measure-method="instant" missing-data="-1"/>
    <name="income" unit="dollars" factor="1000" measurement-type="numerical"/>
      description = "pre-tax income"
      measure-method="instant" missing-data="-1"/>
    :
  </Attributes>
</Actor>
```

BMIInput.xsd

```
:
<Element name="tick" type="integer"/>
<Element name="weight" type="double"/>
<Element name="height" type="double"/>
<Element name="gender" type="string"/>
<Element name="income" type="string"/>
:
```

Splash Time Aligner

Time Metadata
- Source
  - households
    - Type: continuous
    - Observation type: regular
    - Unit: days
    - Tick field: tick
    - Time interval: 2.0
  - ExerciseOutput
    - Type: continuous
    - Observation type: regular
    - Unit: days
    - Tick field: tick
    - Time interval: 1.0
  - Stores
    - Type: continuous
    - Observation type: regular
    - Unit: days
    - Tick field: tick
    - Time interval: 2.0
- Target
  - BMIInput
    - Type: continuous
    - Observation type: regular
    - Unit: days
    - Tick field: tick
    - Time interval: 1.0

Time Alignment Mapping Table

| Time Alignment | Source Data Field | Time Alignment Method |
|---|---|---|
| ☐ | households:householdType | |
| ☐ | households:income | |
| ☐ | households:preference | |
| ☑ | households:utility | Linear |
| ☐ | households:diet | |
| ☐ | stores:agentid | |
| ☐ | stores:xcor | |
| ☐ | stores:ycor | |
| ☐ | stores:alive | |
| ☐ | stores:food | |
| ☐ | stores:cost | |
| ☑ | stores:numCustomer | Sum |
| ☐ | stores:lastTick | |

Field Attributes Table

| Data Field Attribute | Value |
|---|---|
| Field name | numCustomer |
| Description | |
| Measurement type | numerical |
| Measurement method | aggregation-since-last |
| Encoding of missing data | |
| Preferred alignment method | aggregation-since-last |

[ Generate ] [ View TAML ] [ View JaqL ] [ Done ]

Time aligner is ready

```xml
<taml:time-alignment xmlns:taml="http://com.ibm.splash.time/taml/">
  <target-time name="BMIInput" type="continuous"
               observations="regular" unit="days"
               uri="$SADL_DIR/Schemas/BMIInput.xsd">
    <tick name="tick" interval="1.0"/>
  </target-time>
  <data>
    <source name="households" mode="file" uri="$SADL_DIR/Schemas/households.xsd"
            format="del" delimiter=",">
      <time type="continuous" observations="regular" unit="days">
        <tick name="tick" interval="2.0"/>
      </time>
    </source>
    <source name="stores" mode="file" uri="$SADL_DIR/Schemas/stores.xsd"
            format="del" delimiter=",">
      <time type="continuous" observations="regular" unit="days">
        <tick name="tick" interval="2.0"/>
      </time>
    </source>
  </data>
  <alignments>
    <alignment source="households">
      <key name="agentid"/>
      <attribute name="agentid" alignment-method="copy-from-last"
                 boundary-condition="exact" missing-data="-1"/>
      <attribute name="xcor" alignment-method="copy-from-last"
                 boundary-condition="exact" missing-data="-1"/>
      <attribute name="ycor" alignment-method="copy-from-last"
                 boundary-condition="exact" missing-data="-1"/>
      <attribute name="lastStore" alignment-method="copy-from-last"
                 boundary-condition="exact" missing-data="-1"/>
      <attribute name="nextStore" alignment-method="copy-from-last"
                 boundary-condition="exact" missing-data="-1"/>
      <attribute name="householdType" alignment-method="copy-from-last"
                 boundary-condition="exact" missing-data=""/>
      <attribute name="income" alignment-method="copy-from-last"
                 boundary-condition="exact" missing-data=""/>
      <attribute name="preference" alignment-method="copy-from-last"
                 boundary-condition="exact" missing-data=""/>
      <attribute name="utility" alignment-method="interpolation"
                 boundary-condition="exact" missing-data=""/>
      <attribute name="diet" alignment-method="copy-from-last"
                 boundary-condition="exact" missing-data=""/>
    </alignment>
    <alignment source="stores">
      <key name="agentid"/>
      <attribute name="agentid" alignment-method="copy-from-last"
                 boundary-condition="exact" missing-data="-1"/>
      <attribute name="xcor" alignment-method="copy-from-last"
                 boundary-condition="exact" missing-data="-1"/>
      <attribute name="ycor" alignment-method="copy-from-last"
                 boundary-condition="exact" missing-data="-1"/>
      <attribute name="alive" alignment-method="copy-from-last"
                 boundary-condition="exact" missing-data="-1"/>
      <attribute name="food" alignment-method="copy-from-last"
                 boundary-condition="exact" missing-data=""/>
      <attribute name="cost" alignment-method="copy-from-last"
                 boundary-condition="exact" missing-data=""/>
      <attribute name="lastTick" alignment-method="copy-from-last"
                 boundary-condition="exact" missing-data="-1"/>
      <attribute name="numCustomer" alignment-method="agg-since-last-sum"
                 boundary-condition="exact" missing-data="-1"/>
    </alignment>
  </alignments>
</taml>
```

FIG. 9

Algorithm 1: Generating code to translate each source relation to one with the required time semantics.

1  Input: A TAML specification in which:
2      A desired time alignment is specified for a source relation $S$ and a target relation $T$.
3      $\Delta_T$ is the time between consecutive ticks in $T$.
4      For source relation $S(A_1, \ldots, A_k, \ldots, A_m)$:
5          • $\Delta_S$ is the minimum time interval between ticks in $S$
6          • $A_1$ is the attribute corresponding to the simulated time
7          • $(A_2, \ldots, A_k)$ is an entity key
8          • each $A_j$ ($k+1 \leq j \leq m$) is associated with a time alignment window function $f(t, w_j, A_j)$
9          • source and target times satisfy the boundary conditions $t_0 = 0$, $s_0 \leq t_0 < s_1$, and $s_{n_S-1} \leq t_{n_T} \leq s_{n_S}$,
10         • the size of each group $A_2, \ldots, A_k$ is at least $\lceil \Delta_T / \Delta_S \rceil + 2$.
11 Output: Code for converting source relation $S$ with time ticks at times $s_0, s_1, \ldots, s_{n_S}$ to a relation $T$ with the same schema
   as $S$ but with ticks at times $t_0 = 0, t_1 = \Delta_T, \ldots, t_{n_T} = n_T \Delta_T$.

12 Generate code for the following steps:
13 Sort the source relation $S(A_1, \ldots, A_m)$ by the key $(A_2, \ldots, A_k, A_1)$.
14 Partition the non-key attributes into two initially empty groups $G_1$ and $G_2$ as follows:
15 for $j = k + 1$ to $m$ do
16     if $f(t, w_j, A_j)$ denotes a time alignment window function that has Sum or Average with aggregation since-last
       semantics then
17         $\lfloor$ add $A_j$ to $G_2$
18     else
19         $\lfloor$ add $A_j$ to $G_1$ 20 Let $r_1$ denote the result of applying timeAlignment($G_1, S, n = 2 \cdot \Delta_T$) (see Algorithm 2).
21 Let $r_2$ denote the result of applying timeAlignment($G_2, S, n = \lceil \Delta_T / \Delta_S \rceil + 2 \cdot \Delta_T$) (see Algorithm 2).
22 Join $r_1$ with $r_2$ on key attributes $A_1, \ldots, A_k$ to obtain the final target relation $T$.

FIG. 12A

```
Algorithm 2: timeAlignment(G, S, n, Δ_T): Generating code for time-alignment based on sliding windows.
 1  Input: A set G of attributes of a relation S with key (A_1, ..., A_k), window size n, and target time interval Δ_T.
 2  Output: Code for aligning the attributes G of S.
 3
 4  Generate code for the following steps:
 5  Let s_0 denote the first source time.
 6  for each window w in ExactSlidingWindowBySize(S, n) do
 7      if w[0].(A_2, ..., A_k) is different from w[n-1].(A_2, ..., A_k) then
 8          // this window has tuples from two distinct entities.
 9          Discard w.
10      else
11          The key for each tuple in this window is (A_1 : w[0].A_1, ..., A_k : w[0].A_k).
12          // l and r denote the leftmost and rightmost target tick numbers that are contained in the source time points of w.
13          l = ⌈τ_S(w[0].A_1)/Δ_T⌉
14          r = ⌊τ_S(w[n-1].A_1)/Δ_T⌋
15          if G is not of aggregate-since-last semantics then
16              // if t_l coincides with the leftmost time point of w and w is not the first window
17              if (lΔ_T == τ_S(w[0].A_1)) ∧ (τ_S(w[0].A_1) > s_0) then
18                  Let startTargetTick be l + 1
19              else
20                  Let startTargetTick be l
21              for i = startTargetTick to r do
22                  // generate corresponding value for each attribute in G = (B_1, ..., B_p).
23                  t_i = iΔ_T
24                  Create a tuple [A_1 : τ_T^{-1}(t_i), A_2 : w[0].A_2, ..., A_k : w[0].A_k, B_1 : v_1, ..., B_p : v_p] where
                      v_j = f(t_i, w, B_j) for 1 ≤ j ≤ p.
25          else
26              // if this is the first window
27              if τ_S(w[0].A_1) == s_0 then
28                  Let startTargetTick be l
29              else
30                  Let startTargetTick be the smallest tick i such that iΔ_T > τ_S(w[n-2].A_1).
31              for i = startTargetTick to r do
32                  t_i = iΔ_T
33                  if (i == 0) ∧ (t_i == s_0) then
34                      // target time point t_i = t_0 coincides with first source time point
35                      Create a tuple [A_1 : τ_T^{-1}(t_i), A_2 : w[0].A_2, ..., A_k : w[0].A_k, B_1 : v_1, ..., B_p : v_p] where v_j,
                          1 ≤ j ≤ p, are copied from the corresponding attributes of the source tuple at source time point s_0.
36                  else
37                      if (i == 0) ∨ (i - 1 ≥ l) then
38                          // the target time points t_{i-1} and t_i must be contained within w (where t_{-1} = s_0)
39                          t_i = iΔ_T
40                          Create a tuple [A_1 : τ_T^{-1}(t_i), A_2 : w[0].A_2, ..., A_k : w[0].A_k, B_1 : v_1, ..., B_p : v_p] where
                              v_j = f(t_i, w, B_j) for 1 ≤ j ≤ p.
```

FIG. 12B

SYNCHRONIZATION OF TIME BETWEEN DIFFERENT SIMULATION MODELS

BACKGROUND

The present disclosure relates generally to simulation modeling and more particularly to synchronization of time between different simulation models.

Modern policy, planning, and investment decisions are often made in the context of a complex system. Making good policy and investment decisions requires not just the gathering, mining, statistical analysis, and visualization of data, but also the use of simulation models that can predict future behaviors. This is to help analyze the potential impacts of alternative decisions on future outcomes. Planning such modeling and analysis is complicated because high level decisions frequently require understanding of multilayered interactions relating to diverse systems across a great many domains and disciplines.

Taking many different individual models into account requires collaboration of experts across different disciplines that may be very different from one another and function based on different premises. Collaborative modeling and simulation requires data and information across many domains. This requires a system that recognizes different experts have different worldviews and vocabularies, sit in different organizations, and have often invested much effort in developing and implementing their models using different programming and development paradigms. A comprehensive solution allows for integrated collaborative modeling and a system-oriented approach that incorporates many different ideas across different fields. In order to provide this comprehensive solution, data and information from different sources and across multiple disciplines are required to flow easily between processes to enable an analysis of different aspects of a larger problem.

BRIEF SUMMARY

Embodiments include a method and computer program product for generating a composite simulation model. The method includes receiving a specification request for generating a set of target time-series data from a set of source time-series data and obtaining specification information relating to the set of source time-series data, obtaining specification information relating to the set of target time-series data, and obtaining the source time-series data. The method also includes comparing the source and target specification information to determine if the set of source time-series data are time-aligned with the set of target time-series data and converting the set of source time-series data to the set of target time-series data upon determination that time alignment is needed.

In an alternate embodiment, a computer-implemented method for converting time-series data between time domains including receiving a time-series data in a first time domain and automatically determining that the time-series data in said first time domain is to be converted to a second time domain, wherein metadata of said time-series data are used to determine if the time-series data are to be converted from the first time domain to said second time domain. The method also includes automatically determining specifics of the second time domain from input requirements to a model, the model to receive the time-series data and converting the time-series data from the first time domain to the second time domain.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

FIG. 3 depicts an exemplary flow of a Splash Actor Description Language (SADL) file in accordance with an embodiment;

FIG. 4 depicts a flow diagram showing a SADL file used for a target source in accordance with an embodiment;

FIG. 8 depicts a screen shot illustrating a time alignment GUI in accordance with an embodiment;

FIG. 9 is an example of a Time Alignment Metadata Language TAML file generated from the time alignment GUI of embodiment of FIG. 8 in accordance with an embodiment;

FIGS. 12(a) and (b) depict the main routine and subroutine components of an algorithm for generating code that will, when executed, transform a time series from one time scale to another in accordance with an embodiment.

DETAILED DESCRIPTION

Figure 1:
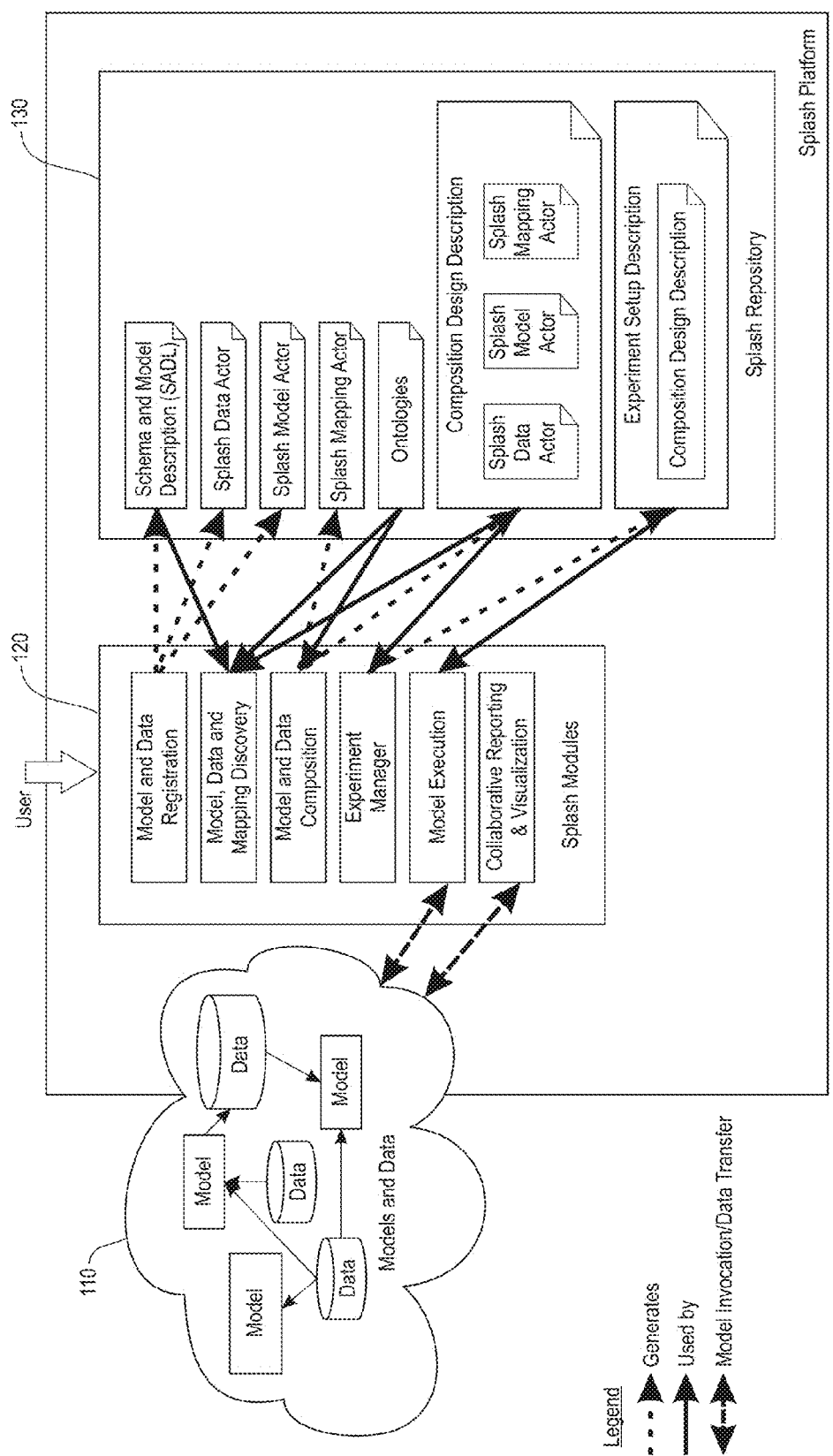
FIG. 1 depicts a block diagram illustrating components used in collaborative modeling in accordance with an embodiment.

FIG. 1 provides a block diagram illustration of an embodiment of the present invention depicting an integrated composite simulation modeling solution. In one embodiment, the simulation models can be each handled by a processor or a computer. To enable such solution, a number of separate simulation models are used together collaboratively and data flows seamlessly across different domains having different and dissimilar processes. Such a flow requires the output of one process to be used easily as the input of another process. One important challenge in the design of such a solution is dealing with providing time alignment of data flowing even across different time domains. FIG. 1 provides a solution that deals with data transformation and time alignment issues.

In one embodiment as will be discussed in detail in conjunction with FIG. 1 and other figures, computer-implemented techniques can be provided through the use of a processor or computer. These techniques can convert data, such as time specific or time-series data, between time domains. This means that if time-series data are received in a first time domain, the technique provides for automatic determination of the time domain related to the time series. The time series, known as a source time series, may have to be then converted to provide the ultimate requested output data, defined as target data. In one embodiment, other information and related data other than the time-series data associated with the source may have to be also obtained, such as from a network or memory.

If the time series data are in a first time domain and the output needs to be in a second time domain, then the data will be converted to the second time domain. In one embodiment, the metadata of the time-series data are used to determine if the time-series data in the first time domain are to be converted to the second time domain. The specifics of the second time domain can also be determined automatically from input requirements to a model that is to receive the time-series data. The time series data can then be converted from a first time domain to a second time domain. One advantage is that this technique can automatically determine for a target if and how time series data are to be converted to a different time domain without initially knowing the specific transformation to take place. In one embodiment, specifications relating to the source and target requested time series, metadata and other data related to them can be used to make the automatic determination as will be discussed in further details below.

For ease of understanding, FIG. 1 will be discussed using the Smarter Planet Platform for Analysis and Simulation of Health (hereinafter Splash) platform that can be implemented by a computer or processor. However, as can be appreciated by those skilled in the art, Splash is only used for discussion purposes and in alternate embodiments other platforms can also be used to provide similar solutions. In addition, to further enhance understanding, the problem of chronic obesity is used as a running example that requires composite modeling and simulation for analysis. The example of chronic obesity is chosen specifically because there are many different contributors to the problem that are very different in nature. Chronic obesity is affected by a broad array of systems such as individual psychology and metabolism, food prices, advertising, transportation, agriculture, education, sanitation, the healthcare system, government policies and international trade. Other examples not related to obesity can be used in alternate embodiments.

FIG. 1 is a block diagram illustration of a system using a Splash platform, as discussed. A module component manager 120 collects information from a variety of different locations. The module component manager 120 is in processing communication with, and has access to, one or more preexisting individual models and datasets, collectively referenced in FIG. 1 as 110. The module component manager 120 also acquires information from other sources such as directly from a user. This may include information that is required by the module component manager 120 at time of a first usage, achievable for example through model and dataset registration. Registration is very useful in embodiments that use Splash as it enables collaborative modeling. Models and data must be registered with Splash before they can be used to create Splash model actors and Splash data actors. These "actors" are components of Splash that encapsulate the framework's knowledge about the various models and data sources. This knowledge is specified via metadata files that are created by the system as part of the registration process as will be discussed later.

Other data management and tools such as visualization tools, directories, experimental data managers, and model-execution managers are also accessible to the module component manger 120 and can be provided as part of the information relating to this component (120). The module component manager 120 is also in processing communication with a repository 130. The repository 130 can include a plurality of data, metadata, and other related descriptions as appropriate.

In embodiments that use Splash, the module component manager 120, repository 130, and other aspects of Splash provide a decision support framework that facilitates combining heterogeneous, pre-existing simulation models and data from different domains and disciplines to gain synergistic understanding of highly complex problems. In Splash, composite models are created by loosely coupling a set of component models via data exchange. In this way, the component models run asynchronously and communicate with each other by reading and writing datasets via file input/output (I/O), database accesses, or even online through web-service calls. Data transformations are applied as needed for compatibility. Transformations convert datasets output by one model into a format suitable for input to another model. The design of such transformations is an important step in providing a composite model. Two important types of transformations are "structural" transformations, which handle mismatches in data formats, also called schemas, and "time-alignment" transformations, which deal handle mismatches in time scales.

Structural data transformations, which are based on schema mappings, are now explained. As mentioned, Splash is based on loose coupling of models via data exchange. In this example, the loose coupling can be possible because every data source is abstracted by a schema and every model is abstracted by a pair of input and output schemas. For instance, a schema might specify that patient data are organized as a series of records whose first field is an integer called "patient number," whose second field is a character string called "patient last name", and so forth. Often, the successive records in a data source represent a time series of observations that are input to or output from a simulation model. The schema then specifies the structure of the information recorded at each observation time. In FIG. 1, this can be provided from the repository 130 or be part of the data in the preexisting component 110.

Schema mappings refer to specifications of how data are to be translated from one schema (the source schema) into another (the target schema), and are embodied by Splash mapping actors. To enable better understanding, an example of dealing with the problem of obesity can be introduced. Health issues related to chronic obesity are affected by a broad array of systems such as individual psychology and metabolism, food prices, advertising, transportation, agriculture, education, sanitation, the healthcare system, government policies, and international trade. This requires a systems-oriented approach to modeling that brings together experts across disciplines to analyze different aspects of the larger problem. In order to provide a collaborative effort, schema mappings from the outputs of one simulation model to the inputs of another simulation model are important. For example, the "daily protein purchased" attribute in a source schema that corresponds to the output of a buying-and-eating behavior model might be mapped to the "daily protein ingested" attribute in a target schema that corresponds to the input to a human-metabolism model (assuming 100% ingestion of purchased food).

In one embodiment, visual design tools such as Clio can be effectively used in facilitating semi-automated design of structural transformations. Clio and similar tools have primarily been developed in the context of data warehousing, where the goal is typically to combine disparate data sources into a common format; the application to composite simulation modeling is novel.

Clio stands for command line language interface operator and is a system for expressing declarative schema mappings. Clio is an IBM® mapping technology and provides a declarative way of specifying schema mappings between XML or relational schemas. Mappings are compiled into an abstract query-graph representation that captures the transformation semantics of the mappings. The query graph can then be compiled into different query languages, depending on the kind of schemas and systems involved in the mapping. Clio produces XQuery, XSLT, SQL, and SQL/XML and other types of queries. Clio provides many advantages when used with simulation and therefore is used in describing some of the embodiments. However, other schema-mapping design tools can be used in alternate embodiments as can be appreciated by those skilled in the art. Moreover, it should be understood that while the workings of some of the embodiments are discussed using Clio, this is to help clarity and as can be appreciated by those skilled in the art, and other tools can be used in alternate embodiments.

As mentioned previously, many of the datasets produced and used by dynamic simulation models take the form of time series. The number of time points in a dataset may be massive when the dataset represents the simulated behavior of a complex system over a long time period using a simulation model with high time resolution. Previous data-integration techniques and tools for generating structural transformations, such as Clio, must be therefore be complemented with new methods for handling, in a scalable fashion, aspects of data integration that are unique to time-series data.

In particular, when dealing with flows of (possibly massive) time-series data between models, there is a crucial need for semi-automatically creating efficient time-alignment data transformations that deal with mismatches in time scales between time-series datasets. Tools such as Clio deal only with schema mismatches at each time point, but not with mismatches of the time-point sequences themselves. As with Clio, visual tools for interactive design of a transformation—together with a capability for automatically creating efficient code to execute the designed transformation—have been helpful in the past to users in semi-automatically designing data transformations (when, e.g., integrating data warehouses), and are highly desirable as aids to composition of simulation models. A Clio-like tool to handle time-scale mismatches is therefore important to composition of simulation models.

A time-aligner module detects time mismatches from metadata, and then provides an extensible graphical user interface (GUI) to assist users in designing appropriate time-alignment transformations. In one embodiment, high-level internal specifications of time-alignment transformations created in the GUI are then stored using a special language. This language is called the, or TAML, in one embodiment. TAML can specify a broad variety of time alignments. Complementary to generating the time-alignment transformation, a tool such as Clio can be used to generate the remaining structural transformations that can both translate source to target schemas. In one embodiment, an enhancement of the Clio data integration tool, called Clio++, can also correct measurement-unit mismatches (such as between pounds and kilograms) at each time step. To enable better understanding, in the discussions that follow, the foregoing design concept is expressed using Clio++, with the understanding that, as known to those skilled in the art, many alternate embodiments are possible.

Using Clio++ enables, in one embodiment, the internal representations of the structural data transformations to be compiled into runtime code that is executed by a Splash "mapper actor" during a simulation run. Similarly, in one embodiment, a code-generation algorithm can be used to compile the internal TAML specification of a time alignment transformation into executable runtime code. In one embodiment, the time-aligner code-generation algorithm can be based on a windowing paradigm that produces highly parallelizable runtime code from a TAML specification. In one particular example, the code-generation algorithm produces Jaql code that can be run on the Hadoop platform for massively parallel map-reduce data processing.

Jaql is a query language designed for Javascript Object Notation (JSON), a data format that supports parallel function processing. Jaql is primarily used to analyze large-scale semi-structured data and is well suited to execution on the Hadoop platform. Hadoop supports data intensive distributed applications and has a computational paradigm named map-reduce. Map-reduce allows applications to be divided into many small fragments of work and each of these can executed on any node in a computer cluster. Hadoop also provides a distributed file system that allows for a very high aggregate bandwidth across the cluster. Both map-reduce and the distributed file system features are designed so that node failures can be handled automatically, allowing large-scale parallel processing on commodity hardware.

The foregoing data-transformation components are now discussed within the context of the entire simulation-composition system, using a specific example. Referring back to FIG. 1, the illustrated components enable domain experts to contribute and use component models and data sources in a collaborative manner. In one embodiment, a component model can mean a simulation, optimization, statistical, or other model implemented by a computer such as in a program that can process data as input and provides data outputs as appropriate. Each model can carry a set of assumptions and has its own set of requirements and constraints on the input and output data. A data source or dataset simply refers to a collection of structured or unstructured digital information. In one embodiment, contributors register their models and data sources in the Splash repository. In this way, a designer of a composite model can in an example benefit from these components by locating them and connecting them together to set up and run simulation experiments, and subsequently analyze, visualize, and share the results with other designers. The new composite model, as well as any useful datasets generated during the simulation experiments, can be registered in the repository and thus be made available to other model designers.

As discussed previously, a data transformation for a file of time series data consists in general of two parts. A time alignment is performed to align the sequence of observation times for the source-data time series to match the desired sequence of observation times for the target-data time series. In addition, a structural transformation—that is, a data transformation that implements a schema mapping—translates the data from the source schema to the target schema data at each (target) observation time. Hereinafter for ease of reference, these two transformations together are referenced as a time-aligned data transformation. In one embodiment, a spatial alignment may also be needed, but such transformations are beyond the scope of the current discussion. As discussed below, the exemplary Splash system first performs a time alignment (if needed) followed by a schema transformation (if needed). These two transformations are orthogonal, however: a schema transformation determines the format of the data at each time tick, whereas a time alignment deals with mismatches in the frequency of source and target time ticks. Thus the two types of transformation can be performed in any order, and can potentially be performed simultaneously to minimize the number of passes over the data.

In one embodiment, metadata files for models and datasets are written in the Splash Actor Description Language (SADL) and generated as part of the registration process. A user can also design and register Splash mapping actors, which handle the data transformations between the outputs of one or more models and the input of another. Splash model, mapping, and data actors are connected to each other by the designer of a composite model, and Splash model and mapping actors are invoked for execution during the course of a simulation run.

To enable composite modeling, in one embodiment, a user can design the composite model by dragging icons (which can represent Splash data actors, model actors, and mapping actors) from the repository window and dropping them into the design workspace. In one embodiment, as the repository becomes large, Splash can then offer model, data, and mapping search capabilities. The user then connects the components and configures the mapping actors.

Figure 2:
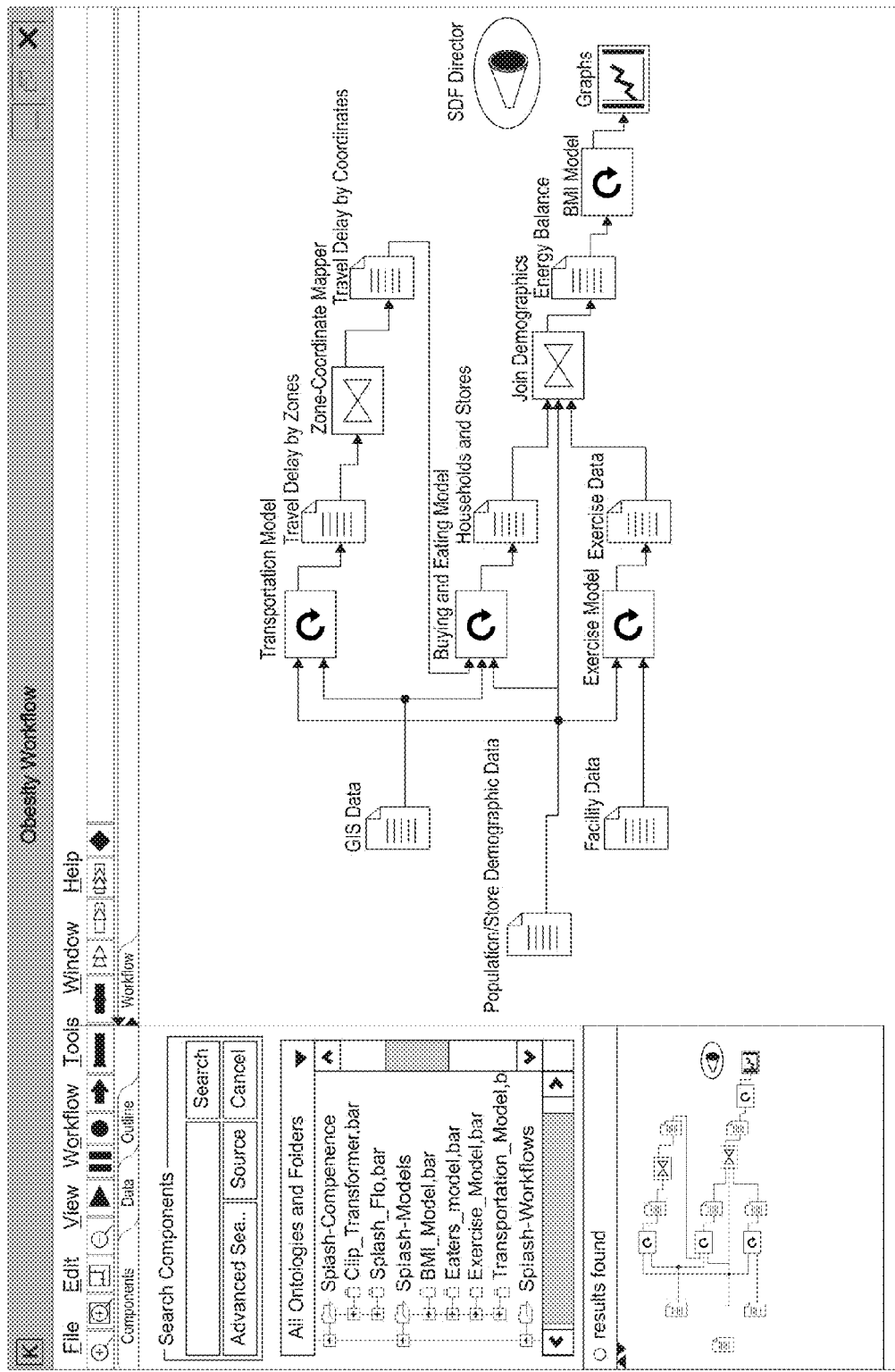
FIG. 2 depicts a block diagram illustrating a composite simulation model used in conjunction with an exemplary embodiment.

FIG. 2 is an illustration of one embodiment depicting a composite model around the obesity example introduced previously. A particular problem is explored in FIG. 2 that is related to chronic obesity. This problem is very specific and explores the effect of encouraging a grocery chain to open a store selling healthy, inexpensive food near an obesity "hot spot." As illustrated data are provided in form of GIS data, population demographic data and facility data.

To enable understanding, only a few of the contributors previously discussed in connection with the problem of obesity are explored in this example. To keep models to a minimum, four specific models are selected in this example with the understanding that others can be explored in alternate embodiments. The four models as illustrated are the transportation model, buying and eating model, exercise model, and body mass index (BMI) model.

The buying and eating model is an agent-based simulation model of the grocery-store shopping behavior of households over time. This includes tracking each individual household and grocery store in the hypothetical urban area. This model takes into account the food preferences of each household, travel time to the different grocery stores, the household's purchasing history, and social factors, such as where a household's neighbors are currently shopping. Grocery stores may close down as a result of poor sales and new stores may open. The transportation model is an off-the-shelf commercial traffic-flow simulation software package that can simulate different modes of public and private transport. This model outputs various statistics, including the average travel times between different urban zones. The exercise model provides a simple discrete-event stochastic simulation model of exercise-facility use. This model returns as output the number of kilocalories burned by each household member per simulation tick. The BMI model is a deterministic differential-equation model of human metabolism that predicts daily changes in BMI for an individual based on daily food consumption and physical activity. In this embodiment, the model outputs a time series, per individual, of daily BMI values.

The Splash model actors corresponding to these simulation models are indicated in FIG. 2 by icons containing circular arrows. Data actors are indicated by icons that look like pages, and include the input datasets (containing GIS data about road networks, demographic data about households and stores, and data about exercise facilities) as well as datasets that are created by running the various simulation models. The mapper actors are indicated by icons containing a pair of sideways triangles that touch at the apex.

In this example, two data transformations may also be required as illustrated. First a Zone-coordinate mapping is needed because the transportation model reports average travel times between zones (i.e., regions), whereas the buying-and-eating model needs to determine travel times between a household and a grocery store based on geographical coordinates (latitude and longitude). The zone-coordinate mapping is designed to overcome the spatial mismatches between the two models. A Joint-demographics mapping is also required. The latter accounts for discrepancies and disjointed data that need to be measured seamlessly and with transparency across the platform. For example, this allows for the outputs of the buying-and-eating model and exercise models to be combined with the demographics data into a format that can be used as input by the BMI model. All such transformations need to overcome unit mismatches and time mismatches that occur between models, and so are a time-aligned data transformations.

To execute a composite model for each simulation run (of the model), Splash uses a "director" mechanism to orchestrate the execution of the component Splash model actors and mapping actors. In this example, the transportation model executes first, followed by the zone-coordinate mapper. Then the buying-and-eating model may execute in parallel with the exercise model. When both models have completed, the join-demographics mapper is executed, followed by execution of the BMI model. In this embodiment, all models and data sources can reside on the same computer as Splash. However, in other embodiments, models and data source may reside in remote, distributed, and heterogeneous processing environments. In one embodiment, Splash can be used as part of a collaborative forum in which data and visualizations can be uploaded, shared, annotated, and rated by a community of users. As indicated, metadata about models, datasets, and mappings plays a key role in all stages of the Splash workflow, enabling model and data discovery, model composition, and composite-model execution. In particular, metadata about time characteristics of models and data underlies the creation of time-aligned Splash mapper actors.

FIG. 3 displays a snippet of the SADL file for the BMI model. Referring back to the discussion about SADL files, these files for models, data, and mappings are created as part of the registration process as illustrated in FIG. 1. For a data source, the provider must specify information such as the schema, data-source location, commands (if needed) to access the data, temporal and/or spatial metadata, and so on. As can be seen, the description language uses XML-style syntax. The file contains information such as the model's owner—i.e., the user who registered this model in Splash—and references about the model, such as scientific papers, URLs, and reviews. The SADL description also contains information about the history of edits made to the SADL file (not shown), a summary description of the model's functionality, and so on. The Actor tag contains basic information about the type of Splash actor being described—model, data, or mapping—using extensible taxonomies of models and data sources. In this example, the SADL description states that the BMI model is a continuous-time, deterministic simulation model. The SADL file also specifies where the model is located and how it is to be executed. In this example, the BMI model resides locally in the directory $EXEC DIR/Models. However, as indicated on the left of FIG. 1, not all models and data reside locally to Splash. Some of the models or data may be accessed via web-service calls or other remote execution protocols, in which case the precise invocation method is specified in the SADL file. Under the Arguments tag, the SADL file references two other SADL files, named BMIInput.sadl and BMIOutput.sadl, that describe the data sources and sinks corresponding to the inputs and outputs of the BMI 6 model. In general, multiple input and output data sources can be referenced, depending on the data input and output structure of a given model.

SADL files for mappings (not shown here) are similar to those for models, comprising pointers to source and target schema files as well as to the file containing the internal representation of the mapping. Such a SADL file also contains the information needed to invoke the data transformation code during a simulation run.

FIG. 4 shows a snippet of BMIInput.sadl, which describes the input data expected by the BMI model, and serves as an example of a SADL file for a data source. The SADL description includes information about the type of data—time-series data in the form of a comma-delimited file in this example—as well as a semantic description of the dataset, time semantics, the location of the schema file for the dataset, and other metadata about every attribute of the schema. In this example, the SADL description states that the observations are given at regular intervals, and each tick corresponds to one simulated day of elapsed time. The tick number appears explicitly in the data file as the tick attribute. The path to this file is given by $EXEC DIR/Data/BMIInput.del—thus the file is a local file—and the file conforms to the schema described in BMIInput.xsd, located in the directory $SADL DIR/Schemas. A snippet of this latter schema file is shown at the bottom of FIG. 4. If a (source) time-series is irregular, the SADL specification might have time attributes of the form <Time type="continuous" observations="irregular" field="obsTime" unit="day"> where the obsTime attribute would be a double representing elapsed time in simulated days.

As discussed below, the time semantics captured by SADL under <Time> are especially important for detecting and correcting time-alignment issues. These semantics apply to every attribute in the schema. An example of a snippet of the time series data for the BMI model might look like the following:

0, 140, 5.5, F, 120, . . .
1, 141, 5.5, F, 120, . . .
2, 140.5, 5.5, F, 121, . . .

The metadata for each attribute includes measurement units, an optional scaling factor, a description of how missing data values are encoded, and a description of the semantics of the attribute. For example, income is in thousands of dollars and represents pre-tax earnings; missing data are encoded as "−1". The "measurement-method" describes the interpretation of a measured value, which can be one of the following: 1) Instant Measurement—a measurement that is made at an instant in time, such as a temperature reading that is taken at noon every day; 2) Aggregation since the last time tick—a measurement that represents the aggregate value of a quantity since the last simulated time tick, such as the total amount of rainfall since the last time point or the average rainfall during the time interval between the last and current time points; and 3) Aggregation since the start: a measurement that represents the aggregate value of a quantity since the start of the simulation, such as the total rainfall or average rainfall since the start of the simulation.

The per-attribute metadata are summarized in Table 1. Though not shown, the SADL file may also describe general constraints on possible data values, for example, that weight must lie between 0 and 400 pounds or that pre-tax income must exceed after-tax income; such information facilitates both error checking and model composition. In addition to the contents described above, a SADL file for a model, mapping, or data source may include additional information, such as ownership, update history, provenance, and access restrictions. Additional information (not described here) for facilitating Splash's Experiment Manager component may also be present. The description language is extensible, allowing for future enhancements.

TABLE 1

Metadata for attributes of a schema

| Metadata | Type |
| --- | --- |
| "name" | The attribute name (string) |
| "description" | Semantic meaning of attribute (string) |
| "dimension" | {"time", "mass", "length", etc.} |
| "unit" | {"days", "hr", "kg", "watts", "miles/hour", "g-cm$^2$/sec$^2$", etc.} |
| "factor" | Scaling factor for units (positive integer) |
| "measurement-type" | {"constant", "numerical", "boolean", "categorical", "textual"} |
| "measurement-method" | {"instant", "aggregation-since-last", "aggregation-since-start"} |
| "missing-data" | A regular expression describing all possible encodings of missing data |

The detection and correction of time mismatches are now discussed. An exemplary problem of time-aligned data transformation arises in the obesity model in several instances. The buying-and-eating model (the "source") outputs a set of data once every two simulated days, whereas the BMI model (the "target") expects input once per simulated day. Thus a time-aligned data transformation is needed. In this case, data for odd numbered days such as "weight" must be interpolated using the data from the even numbered days; e.g., if a person weighs 60 kg on day 2 and 62 kg on day 4, then a reasonable estimate of their weight on day 3 is 61 kg. Other data, such as the amount of protein purchased over a two day interval, must be allocated between days; e.g., if a person shops daily and purchases a total of 300 g of protein over days 2 and 3, then they may reasonably be estimated to purchase 150 g of protein on each of these days. (If the situation were reversed, with the buying-and-eating model producing data every simulated day and the BMI model expecting data once every two days, then a time alignment would involve aggregating the data values: weight over a two day interval might be obtained by averaging a pair of daily weights, and total protein purchased over a two day interval would be obtained by summing the daily purchased quantities.) After these time alignments are performed to yield an interpolated time series of daily outputs from the buying-and-eating model, these outputs must be transformed into suitable inputs for the BMI model via a schema mapping. For example, the "protein purchased" attribute of the buying-and-eating model must be mapped to the "protein consumed" attribute of the BMI model. Such a mapping might also need, for example, to convert measurement units from pounds to kilograms.

Figure 5:
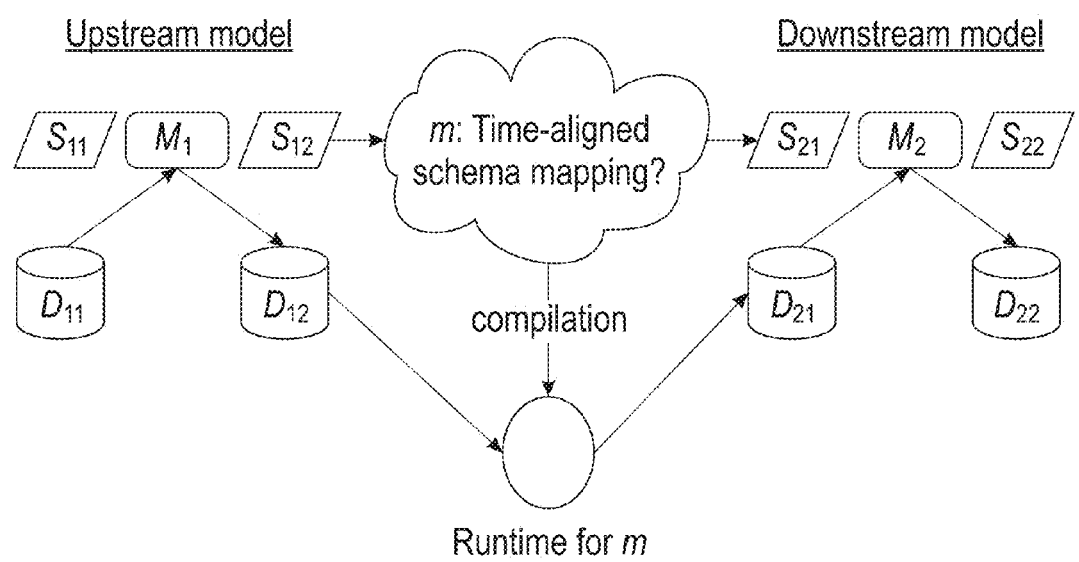
FIG. 5 depicts examples for source and target models using SADL files in accordance with an embodiment.

To enhance understanding, a pair of source and target models M1 and M2 is illustrated in FIG. 5. Model $M_i$ (i=1, 2) has input schema $S_i1$ and output schema $S_i2$, and input and output datasets $D_{i1}$ and $D_{i2}$. The goal is to semi-automate the process of generating runtime code for transforming the data $D_{12}$ that is generated by the source model $M_1$ into $D_{21}$ so that it can be ingested by the target model $M_2$. If the output data $D_{12}$ of $M_1$ and the input data $D_{21}$ of $M_2$ represent time series and there is a time mismatch between them, then the user first provides a high level specification $m_1$ of a required time alignment, followed by a high-level specification $m_2$ of a schema mapping. The system then automatically generates runtime code from $m=(m_1,m_2)$ that can be used to execute the desired transformation on an instance of $D_{12}$ to derive an instance of $D_{21}$ that can be passed to $M_2$. To add less complexity, the focus of the discussion will be on the specification of the time-alignment operation $m_1$. The focus will also be on a single pair of models, but more generally, there may be several data sources that need to be aligned, transformed, and combined to create the input to a target model. In this case, each source can simply be aligned to the target independently, so that the time alignments can be designed and executed independently. (The schema mapping and subsequent structural transformation, however, must usually consider all data sources simultaneously; data integration tools such as Clio have this capability.)

A source dataset comprising a time series can be represented as a sequence $$S=\langle (s_0,d_0),(s_1,d_1),\ldots,(s_{n_s},d_{n_s})\rangle,$$

where $s_i$ is the time of the ith observation and $d_i$ is the associated data observed at time $s_i$. Each $d_i$ can be viewed as a k-tuple for some k that is greater or equal to 1. The "ticks," or indices, run from 0 to $n_s$. Similarly, one can represent a target dataset as $$T=\langle (t_0,\bar{d}_0),(t_1,\bar{d}_1),\ldots,(t_{n_s},\bar{d}_{n_s})\rangle.$$

It is assumed throughout that the source time points are strictly increasing: $s_0<s_1<\ldots<s_{n_s}$. Moreover, the target time points are required to be evenly spaced and start from simulated time $$t_0=0, \text{ so that } t_1=i\Delta_T \text{ for some } \Delta_T>0$$

and all $$i\in\{0,1\ldots n_t\}$$

This is usually the case in practice. If there are no requirements at all on the target time points, then no time alignment is needed, and there is usually no natural way to define target time points at irregular intervals. Generally, no loss of generality is entailed by assuming that $t_0=0$, since otherwise the data can, in effect, be uniformly shifted along the time axis by appropriately modifying the time-alignment computations. In this example, to prevent additional complexities, is assumed that there are no invalid or missing data values (such values have been corrected or imputed prior to the time alignment step.) Finally, it is assumed that $$s_0\leq t_0<s_1 \text{ and } s_{n_s-1}<t_{n_t}\leq s_{n_s}$$

In other words, the minimum and maximum source time points bracket the target time points, and any extraneous data points at the upper and lower boundaries of the source time series have been removed prior to time alignment. All time alignment operations can be viewed as applying an "alignment function" over a "window." Specifically, suppose that one wishes to compute the target data value $$\bar{d}_i \text{ at target time } t_i \text{ for some } i\in\{1,2,\ldots,n_t\}$$

Then the window $W_i$ for $t_i$ is simply a subsequence of S that contains the information needed to perform the computation. Often, the window has the form $$W_i=\langle (s_j,d_j),(s_j+1,d_j+1),\ldots,(s_j+k,d_j+k)\rangle, \text{ where}$$
$$s_j\leq t_i\leq s_j+k,$$

so that the window comprises data observed at contiguous times points of S that span the target time point $t_i$. If the window width $|W_i|$—that is, the number of $(s_i, d_i)$ pairs in $W_i$—is the same for each $t_i$, then the sequence of windows behaves as a sliding window over S. The desired interpolated data $\tilde{d}_i$ is computed by applying appropriate alignment function to the data in $W_i$. Some common time alignment operations can now be discussed in terms of the foregoing framework. For simplicity, suppose that each source-data observation $d_i$ comprises a single attribute value. In principle, an alignment procedure needs to be performed separately for each attribute; in practice, multiple alignment operations might be performed during a single scan over the source data.

The most common types of interpolation are piecewise linear interpolation and natural cubic spline interpolation. For linear interpolation, the window is defined as:

$$W_i=\langle (s_j,d_j),(s_{j+1},d_{j+1})\rangle, \text{ where } j=\max\{n:s_n\leq t_i\}$$

For $$s_j\leq t_i<s_j+1$$

The alignment function computes the interpolated data value as $$\tilde{d}_i = d_j + \frac{t_i - s_j}{s_{j+1} - s_j}(d_{j+1} - d_j).$$

Natural cubic splines are more complex, but have better smoothness properties. The idea is to define a function d(x) such that (1) $d(s_i)=d_i$ for each i, (2) d is a cubic polynomial over each interval $[s_i; s_{i+1}]$, and (3) the second derivative d″ exists and is continuous throughout the interval $[s_0; s_{n_s}]$. A cubic spline is natural if $d''(s_0)=d''(s_{n_s})=0$, so that the interpolating function looks like a straight line to the left and right of $[s_0; s_{n_s}]$. Set $h_i=s_{i+1}-s_i$ and denote by $\square=(\square_1, \square_2, \square_3,\ldots,\square_{n_s})$ the solution to the linear systems of equations $A\square=b$, where $$A = \begin{bmatrix} 1 & 0 & 0 & 0 & \ldots & 0 & 0 & 0 \\ \frac{h_0}{6} & \frac{h_0+h_1}{3} & \frac{h_1}{6} & 0 & \ldots & 0 & 0 & 0 \\ 0 & \frac{h_1}{6} & \frac{h_1+h_2}{3} & \frac{h_2}{6} & \ldots & 0 & 0 & 0 \\ \vdots & \vdots & \vdots & & \ddots & \vdots & \vdots & \vdots \\ 0 & 0 & 0 & 0 & \ldots & \frac{h_{n_s-2}}{6} & \frac{h_{n_s-2}+h_{n_s-1}}{3} & \frac{h_{n_s-1}}{6} \\ 0 & 0 & 0 & 0 & \ldots & 0 & 0 & 1 \end{bmatrix}$$

-continued $$b = \begin{bmatrix} 0 \\ \frac{d_2 - d_1}{h_1} - \frac{d_1 - d_0}{h_0} \\ \frac{d_3 - d_2}{h_2} - \frac{d_2 - d_1}{h_1} \\ \vdots \\ \frac{d_{n_s} - d_{n_s-1}}{h_{n_s-1}} - \frac{d_{n_s-1} - d_{n_s-2}}{h_{n_s-2}} \\ 0 \end{bmatrix}$$

Then the window $$W_i = \langle (s_j, d_j), (s_{j+1}, d_{j+1}) \rangle$$

is defined exactly as for piecewise linear interpolation, and the alignment function computes the interpolated data value as $$\tilde{d}_i = \frac{\sigma_j}{6h_j}(s_{j+1} - t_i)^3 + \frac{\sigma_{j+1}}{6h_j}(t_i - s_j)^3 + \left(\frac{d_{j+1}}{h_j} - \frac{\sigma_{j+1}h_j}{6}\right)(t_i - s_j) + \left(\frac{d_j}{h_j} + \frac{\sigma_j h_j}{6}\right)(s_{j+1} - t_i)$$

The information in the window $W_i$ is not quite enough to compute the because the quantities $\square_j$ and $\square_{j+1}$ are also needed. Still, these can be found and fit into this interpolation scheme by source tuple $d_i$ being appended by $\square\square_i$ as a new attribute. Generally $\square_i$ are computed in a preprocessing step. Even simpler interpolations are nearest-neighbor and copy-from-last. As with linear and cubic-spline interpolation, the window $$W_i = \langle (S_j, d_j), (s_{j+1}, d_{j+1}) \rangle$$

can be used for nearest-neighbor and copy-from-last. The alignment function sets $$\tilde{d}_i = \begin{cases} d_j & \text{if } t_i - s_j \leq s_{j+1} - t_i; \\ d_{j+1} & \text{otherwise} \end{cases}$$

for nearest-neighbor and for copy-from-last:

$$.\tilde{d}_i = d_j.$$

An appealing feature of these schemes is that they can be used for any type of data—boolean, categorical, and so on—whereas the piecewise linear and cubic spline methods only apply to numerical data.

Interpolation time alignments are needed for "instantaneous" measurements of quantities such as weight or temperature. When an aggregated measurement method is used, such as "rainfall since the previous time point" then alternative time alignments are needed. Most of these alignments can be viewed as applications of an aggregation-style alignment function within this general framework. The focus here can be on SUM and AVERAGE aggregates to exemplify a number of different cases.

Case 1—Aggregation-since-start: First consider measurements that represent the SUM of some quantity since the start of the measurement period, e.g., the start of the simulation. The window for a target time $t_i$ is:

$$W_i = \langle (s_j, d_j), (s_{j+1}, d_{j+1}) \rangle$$

As before, $j = \max\{n : s_n \leq t_i\}$, so that $s_j \leq t_i < s_{j+1}$. The alignment function sets $$\tilde{d}_i = d_j + (d_{j+1} - d_j)\frac{t_i - s_j}{s_{j+1} - s_j} \qquad (1)$$

To estimate the AVERAGE of some quantity since the start of measurement, use the same window but with the following alignment function:

$$\tilde{d}_i = \frac{1}{t_i}\left[D_j + (D_{j+1} - D_j)\frac{t_i - s_j}{s_{j+1} - s_j}\right],$$

This formula is obtained by multiplying each pertinent cumulative-average data point $d_i$ in the source by $s_i$ to convert it to a cumulative sum, then applying (1) to estimate the cumulative sum at time $t_i$, and finally converting this cumulative sum to a cumulative average via division by $t_i$.

Figure 6:
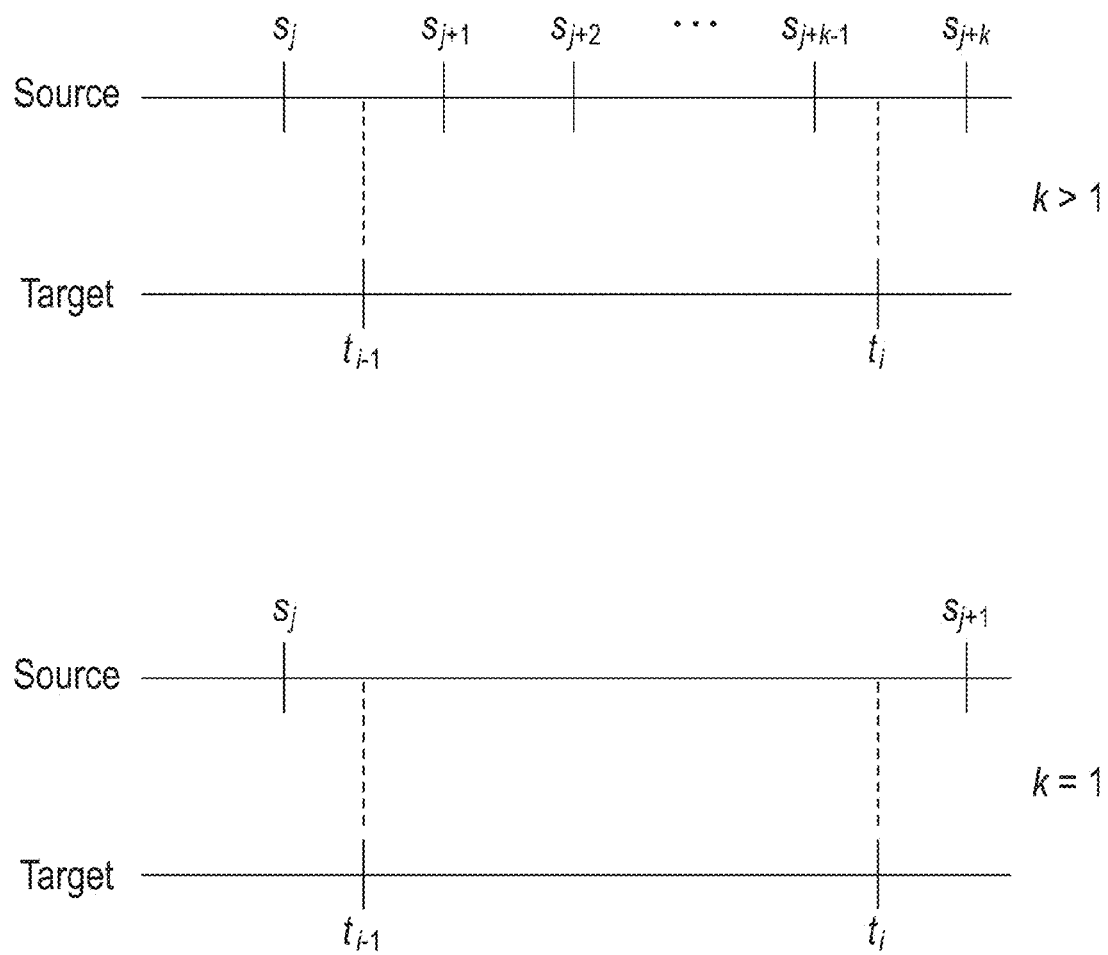
FIG. 6 is a graphical illustration of source and target sequences of points in time used for aggregation in relation to one another in accordance with an embodiment.

Case 2—Aggregation-since-last: when the source measurements represent the SUM since the last (source) tick, the estimation formulas become more complicated. The window is $$W_i = \tilde{d}(s_j, d_j), (s_{j+1}, d_{j+1}), \ldots, (s_{j+k}, d_{j+k})\tilde{d}$$

where $j = \max\{n : s_n \leq t_{i-1}\}$ and $k = \min\{n : s_{j+n} \geq t_i\}$. Thus, $s_j$ is the greatest source time point less than or equal to $t_{i-1}$ and $s_{n+k}$ and is the smallest source time point greater than or equal to $t_i$; see FIG. 6.; see FIG. 6. For $1 \leq i \leq n_t$, the alignment formula is then $$\tilde{d}_i = \begin{cases} \frac{s_{J+1} - t_{i-1}}{s_J + 1^{-s_J}}d_{j+1} + \sum_{n=j+2}^{j+k-1} d_n + \frac{t_i - s_{j+k-1}}{s_{J+k} - s_{j+k-1}}d_{j+k} & \text{if } k > 1 \\ \frac{t_i - t_{i-1}}{s_J + 1^{-s_J}}d_{j+1} & \text{if } k = 1 \end{cases}$$

In this formula $$\Sigma_a^b x_i = 0 \text{ whenever } b < a$$

When the target time points are denser on the time axis than the source time points, use of the estimation formula (2) results in the allocation method discussed. Thus allocation can be viewed as a special case of aggregation. Recall that $t_0 = 0$ by assumption. When $i = 0$, the convention is adopted that $$\tilde{d} = d_o \text{ if } t_o = s_o$$

If, on the other hand:

$$s_o < t_o < s_1, \text{ then } \tilde{d}$$

is computed from (2), using the convention that $t_{-1} = s_0$. When the source measurements represent the AVERAGE since the last (source) tick, one can derive an estimation formula using the strategy from Case 1. The same window $W_i$ is used as above. Defining $D_i = d_i (s_i - s_{i-1})$ we find that the alignment function for $1 \le i \le n_t$ is $$\tilde{d}_i = \begin{cases} \dfrac{1}{t_i - t_{i-1}} \left[ \dfrac{s_{j-1} - t_{i-1}}{s_{j+1} - s_j} D_{j+1} + \sum_{n+j+2}^{j+k-1} D_n + \dfrac{t_i - s_{j+k-1}}{s_{j+k} - s_{j+k-1}} D_{j+k} \right] & \text{if } k > 1 \\ d_{j+1} & \text{if } k = 1 \end{cases} \quad (3)$$

As in the case of SUM:

$$\tilde{d} = d_o \text{ if } t_o = s_o. \text{ If } s_o < t_o < s_i, \text{ then } \tilde{d}_o$$

using the convention that $t_{-1} = s_0$.

Up to now the assumption has been that $s_0$ and $s_{n_s}$ minimally bracket the target time points. Hence, it is always possible to construct a window $W_i$ that contains sufficient information to compute data values at any target time $t_i$. In practice, $s_0$ or $s_{n_s}$ might be missing or invalid. There are two standard ways to deal with this situation for these boundary conditions.

First is the "Exact" approach. In this approach, no data value will be returned for $t_i$ if $W_i$ does not contain sufficient information (i.e., the data values will be encoded as missing values). The second approach is the "Periodic" approach where if the source data are regular, this option specifies that when there are insufficient data points available at the beginning (resp., end) of a time series, the window wraps around to use data points at the end (resp., beginning) of the time series.

Figure 7:
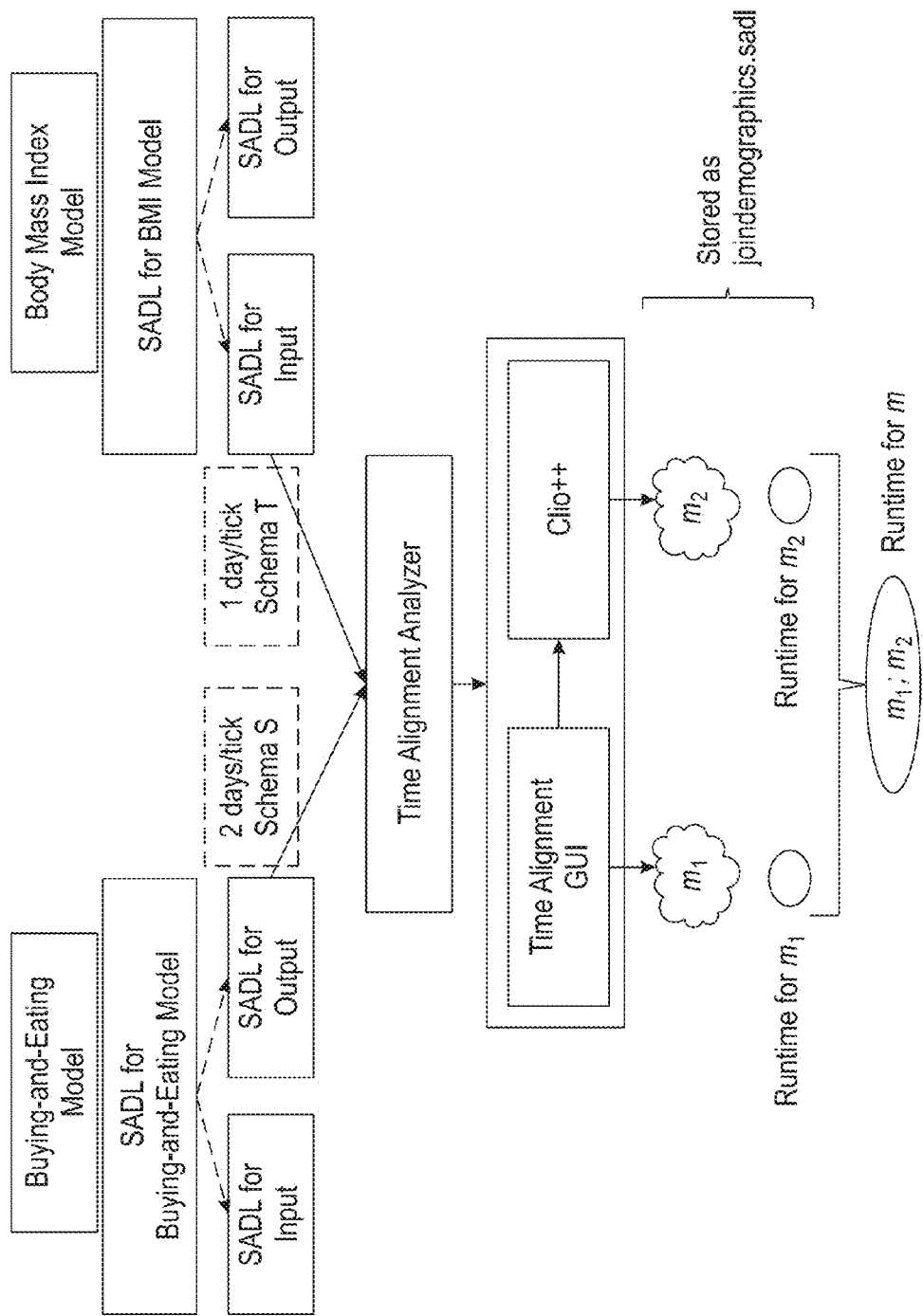
FIG. 7 depicts a process flow illustrating an overview of a time alignment process in accordance with an embodiment.

At this point it may be helpful to consider some of the issues relating to semi-automatic data transformations via a specific example. FIG. 7 depicts an overview of the time-alignment process in the context of the buying-and-eating and BMI models. When the user specifies that the buying-and-eating model is to be connected with the BMI model, the time analyzer is first invoked to determine the time compatibility of the two models.

A source is said to be time compatible with a target model if they have the same values for the type, observations, and value keys in the <Time> tag (after harmonizing time-measurement units if needed). For example, recall from FIG. 4 that the time attributes for the input to the BMI model are given by
<Time type="continuous" observations="regular" field="tick" unit="day" value="1">

The analogous SADL description for the output from the buying-and-eating model would be
<Time type="continuous" observations="regular" field="tick" unit="day" value="2">

Because of the difference in the value attribute, the time analyzer would detect a time incompatibility, and invoke a time alignment GUI. As another example, if the SADL for a data source specifies observations="irregular" and the target SADL specifies observations="regular", then a time incompatibility is detected. If no incompatibility is detected, then the Clio++ schema mapping design tool is invoked for designing the structural mappings between the output of the upstream model and the input of the downstream model, if needed. In general, there may be multiple data sources that are selected to be connected to a target model, where some of the sources may be output by a plurality of source models, and other data sources might be directly specified by the modeler. The set of source models is time compatible with the target model if and only if every source model is individually time compatible with the downstream model.

FIG. 8 is an illustration of a time alignment GUI. In the figure, the leftmost panel displays the time metadata that correspond to the source and target datasets. There are three source datasets shown, of which the focus will be on the two—households and stores—that are produced by the buying-and-eating model. These two datasets are described by the files households.sadl and stores.sadl. There is a single target dataset, which corresponds to the input of the BMI model. The target dataset is the input to the BMI model and is described by the file BMIInput.SADL as in FIG. 4. Along with the list of datasets is the information about time. Each source dataset comprises time series data in which each tick corresponds to two days of simulated time, whereas each tick in the target dataset corresponds to one day of simulated time.

By contrast, the right panel consists of two subpanels: the top subpanel lists all attributes that appear in the source SADL files, and the bottom subpanel lists the metadata values for the currently selected attribute (stores.numCustomers in this case). The metadata elements for an attribute are as described in Table 1. The top subpanel is a menu where the user specifies the desired time alignment method for each source attribute from a drop-down list of options. The user can choose to apply no time alignment at all to a given attribute by unchecking the corresponding checkbox in the first column (e.g., householdType, income, preference etc.). In this case, the target data value at a given target time point $t_i$ will be copied from the value of the last source time point (i.e., copy-from-last). When clicking on the drop-down menu of time alignment functions for a given attribute, only applicable time alignment functions will be displayed. For example, aggregation alignment functions (sum and average) will not be displayed for an "instant" measurement such as temperature. The time alignment GUI determines whether or not a time alignment function is applicable for an attribute by making use of metadata captured by the SADL descriptions.

The metadata used for this purpose consists of information under <Time> from both the output SADL of the buying-and-eating model (i.e., 2 days per tick) and the input SADL of the BMI model (i.e., 1 day per tick). In addition, it makes use of "measurement-type" and "measurement-method" metadata that are contained in the SADL file for the output of the buying-and-eating model. Recall that the attribute "measurement-type" specifies whether the measurement produces a constant, numerical, textual, or categorical value, and the attribute "measurement-method" specifies whether the measurement is instant or aggregated over a time period. In the latter case, it can either be aggregated since the last time tick of the simulation (i.e., "aggregation-since-last") or since the start of the simulation (i.e., "aggregation-since-start"). Table 2 summarizes the set of applicable time alignment functions, which depend on the data type and method of measurement. For example, if a SADL file specifies measurement-type="numerical" and measurement-method="aggregation-since-last" for a given attribute, then the user will be able to choose between SUM or AVG as the time alignment function in the third column of the upper right subpanel in the GUI. The specification created in the time alignment GUI is compiled into an intermediate representation from which executable code can be generated. This is similar to the behavior of the Clio data-integration tool, where the schema mapping created in the graphical user interface is first compiled into a high-level internal representation from which different runtime codes (e.g., XQuery, XSLT, or SQL) can be generated. In Splash, a time alignment is encoded using a "Time Alignment Metadata Language" (TAML).

TABLE 2

Applicable time alignment functions depending on the type and method of measurement.

| Measurement-type | Measurement-method | Applicable time alignment functions |
|---|---|---|
| constant OR textual | — | copy-from-last |
| numerical | instant | interpolation (nearest neighbor, linear interpolation) |
| numerical | aggregation-since-last | aggregation (sum, average) |
| numerical | aggregation-since-start | aggregation (sum, average) |
| boolean OR categorical | — | nearest-neighbor interpolation or copy-from-last |

FIG. 9 illustrates the TAML file that is saved from the time alignment GUI of FIG. 8. It contains metadata about the target and source datasets under target-time and data tags. As can be seen, the target-time tag specifies metadata about the time scale for the target dataset. This metadata has been derived from the SADL file for the BMIInput data source. The data tag lists the source datasets and associated metadata and shows where to find the corresponding schema files. For each data source that needs to be processed, an alignment operation is specified for each attribute in the source's schema. If no alignment operation is specified, the default alignment operation is "copy-from-last". For this example, except for the attributes utility and numCustomers, which has "interpolation" (i.e., linear interpolation) and "sum" methods as their time alignment functions, the rest have "copy-from-last" as their default time alignment function. In addition, the boundary condition specifies the action to be taken when the source time ticks do not completely span the target time ticks. In one embodiment, the exact boundary condition is supported. This means that the missing-data value will be used to represent the value associated with a target time t whenever there are insufficient source time points for computing the value for t. The missing-data value to be used is described under the missing-data attribute in the SADL file.

The time alignment GUI is used to specify a time-alignment data transformation that corrects the time mismatch between data sources. In the running example of FIG. 7, the time alignment GUI is used to generate the mapping $m_1$. After this, Clio++ is invoked to generate the remaining structural and measurement-unit transformations between models. That is, Clio++ is used to design and compile code for the mapping $m_2$ in FIG. 7.

Figure 10:
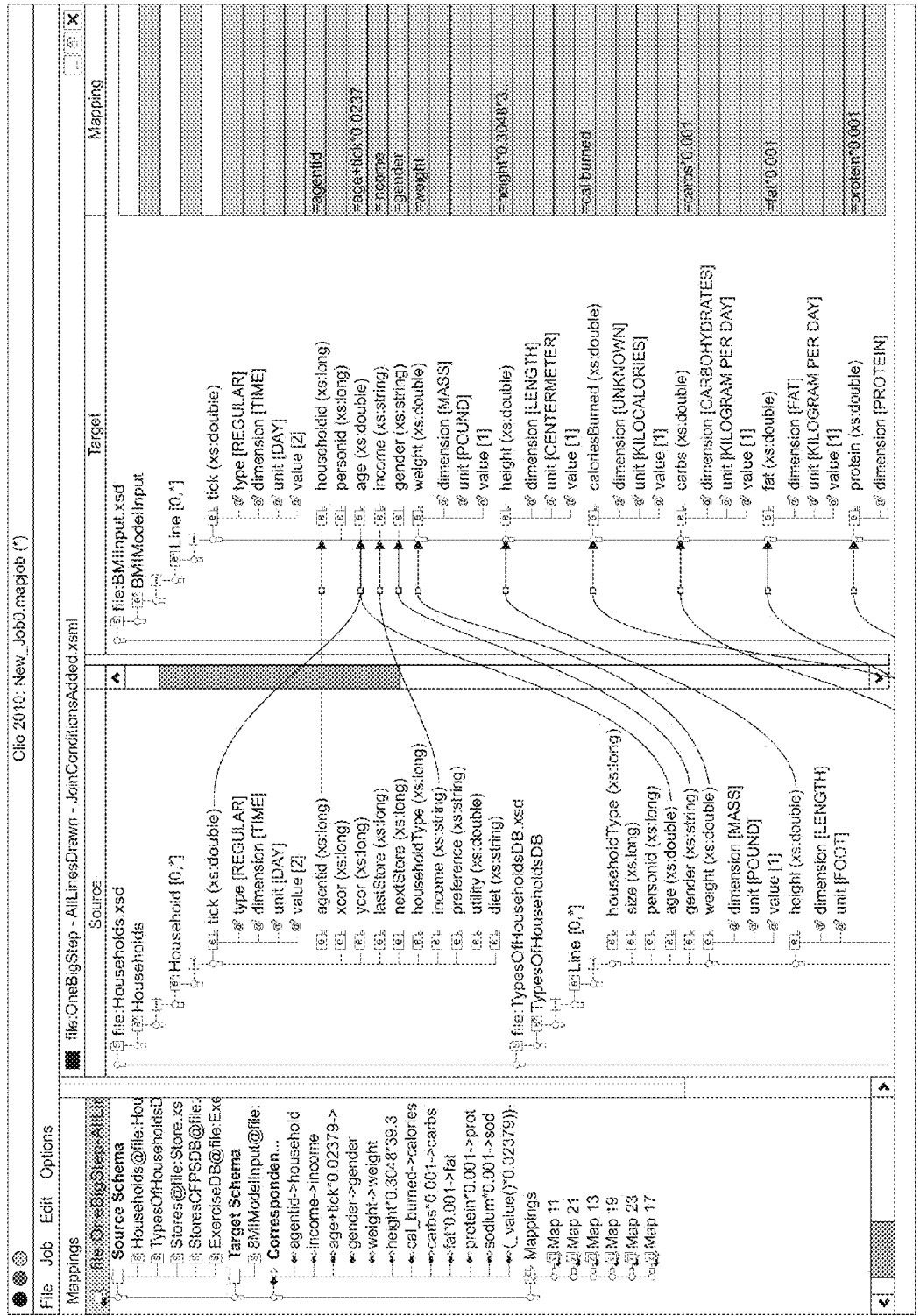
FIG. 10 depicts a screen shot example of a Clio++ providing visual relationships between source and target schemas in accordance with an embodiment.

FIG. 10 displays a screenshot of Clio++. As can be seen, Clio++ allows the user to visually specify the relationships between the source schemas (e.g., the schemas of the demographics data sources and of the output files generated by the various models) and the target schema (e.g., the input schema of the BMI model). The relationships are specified by drawing lines to connect attributes in the source and target schemas. Although not shown, Clio++ also allows the user to specify intra-schema constraints. The resulting specification determines the procedure by which the demographics data and the various time series produced by the simulation models are joined into the single time series expected by the BMI model. During the process of associating attributes in the source and target schemas, Clio++ automatically generates transformations that correct mismatches in measurement units (such as pounds to kilograms)—see the rightmost column in FIG. 10. Clio++ stores the time alignment created in the GUI using XSML, an XML mapping specification language; this internal representation can be persisted and read back into Clio++. In one embodiment, enhancements can be made to Clio++ to include display of semantic data for each source and target attribute, and additional transformations that "integrate" or "differentiate" a time series to allow, e.g., transformations between time series consisting of measurements aggregated since the last time point and time series comprising measurements aggregated since the start of the simulation. In an envisioned embodiment, the Clio++ tool can suggest mappings between source and target attributes, so that a user can often simply tweak a proposed solution rather than having to draw lines from scratch.

As with regards to the generation of runtime code for both Clio++ and the time aligner, Splash generates executable runtime code from a high-level internal representation of a transformation, where this representation is usually created by the user via a GUI. The representation is in XSML in the case of Clio++ and TAML in the case of the time aligner. This code is encapsulated in a Splash mapper actor that is invoked during simulation runs. For example, after designing the join-demographics mapping that was described earlier for the obesity model, the code-generation step would produce the join-demographics actor that is represented by an icon in FIG. 2. Efficient execution of transformations between massive datasets is a key priority in Splash, and so the high level code-generation algorithms are designed to support generation of parallelizable code.

In particular, one of the runtime languages supported by Splash is the Jaql query processing language. Jaql queries are executed on the Hadoop platform, which relies on commodity hardware and is well suited to robust, massive parallel processing of the large amounts of data created by complex simulation models. The transformations specified by Clio++ are standard relational operations such as selection and join. Because the Jaql language was designed to handle precisely these operations, generation of Jaql code from Clio++ is relatively straightforward.

An additional algorithm now will be described for generating code that will efficiently transform a set of source time series $S_1, S_2, \ldots, S_r$ to a set of (intermediate) target time series $T_1, T_2, \ldots, T_r$. Here each $S_i$ may be irregular in that there is no fixed time interval between consecutive ticks, whereas each $T_i$ has the same schema as $S_i$, but is a regular time series with exactly $\Delta T$ time units between consecutive ticks. The Clio++ transformations would then be applied to $T_1, T_2, \ldots, T_r$ to yield a final target time series that could then be input into a downstream model. For example, these algorithms will generate code for transforming each of the source time series households and stores—where the interval between consecutive time ticks is two days—to a target relations households' and stores' having the same respective schemas but with $\Delta T=1$, i.e. with exactly one day between consecutive time ticks. Clio++ can be used to combine households' and stores' with other datasets to create the data source BMIInput that is used by the BMI model.

For simplicity, the algorithms are presented assuming that there is a single source time series S and target time series T, but it is straightforward to adapt the algorithms to handle multiple source time series. $\Delta S$ is provided to denote the minimum time interval between consecutive ticks in S. It is assumed that the initial target time point satisfies $t_0=0$ and that the usual boundary conditions hold:

$$s_0 \leq t_0 < s_1 \text{ and } s_{n_a-1} < t_{n_t} \leq s_{n_a}$$

Now the missing source data points at the boundaries can be calculated. The source time series is denoted as a relation $S(A_1, A_2, \ldots, A_k, A_m)$, where $A_1$ is the attribute that captures information about the time that an observation is made. Similarly, the target time series T is represented as a relation with the same schema as S. A frequently encountered complication is that $S=S(A_1, A_2, \ldots, A_k, \ldots A_m)$ will often contain time-series data for multiple entities. For example, in the obesity model a separate time series of shopping and eating behavior for each household is maintained. It is assumed that S contains a (possibly compound) key called the entity key that uniquely determines the entity to which each source tuple corresponds. The goal is to create a target time series for each entity. Subsequently, one can join these time series on the time attribute and then sort by entity key to create a combined time series, if desired. For example, tick is the time attribute and agentid is the entity key for both households and stores, and (agentid,tick) is an overall key for each of these relations. So if u1 and u2 are a consecutive pair of tuples in the households relation that correspond to the same entity (i.e., household), then u2:tick=u1:tick+1 and u2 describes the household's state two days after the observation given by u1. The algorithm will generate code for inserting a "middle" tuple that represents the household one day after u1.

Often the time attribute $A_1$ will be a real number that corresponds to a point in continuous time. For a regular time series, however, it may be the case that $A_1$ is an integer that corresponds to the tick number for a source observation. It is assumed that the existence of a function $\tau_S$ that maps the domain of $A_1$ to the real line, so that $\tau_S(u.A_1)$ is the point in continuous time to which the tuple-valued observation u corresponds. For example, the source relations households and stores in the TAML specification of FIG. 9, references two source relations, households and stores, which are each regular time series, where the attribute $A_1$=tick is the tick number of a source observation. In this case, $\tau_S(u.A_1)=2u.A_i$ for a tuple u in either source relation, since $s_0=0$ and the interval between consecutive ticks is two days. (Also note that $\tau_S(u.A_1)=2$ is trivially the minimum time between successive ticks for each of these time series.) If $A_1$ is already represented as a point in continuous time, then $\tau_S$ is simply the identity function. Similarly, for the target time series with time domain $A_1$, assume the existence of an invertible function $\tau_T$ that maps the domain of $A_1$ to time points on the real line. In the running example: $\tau_T(v.A_1)=\Delta_T v.A_1$ for any tuple v in T, and $\tau_T^{-1}(t)=t/\Delta_T$ for any target time point t, where $\Delta_T=1$.

More generally, time may be represented in S using multiple attributes, such as hours, minutes, and seconds since the start time $s_0$. In this case, $\tau_S$ would be defined over the joint domain of these attributes. (Similarly, time may be represented in T using multiple attributes.) For simplicity, an example of an algorithm is presented for the case of a single time attribute for which the required modifications for the general case are straightforward.

As discussed previously, the algorithms use a windowing paradigm to generate parallelizable code, such as Jaql. In general, the value of an attribute B at a target time $t_i$ can be computed by applying an appropriate alignment function, denoted by $f(t_i, W_i, B)$, to an appropriate window $W_i$ of source data points. The usual case is that the window $W_i$ will "contain" the target point $t_i$. [In general, a window of k consecutive source tuples $u_1, u_2, \ldots, u_k$ with time attributes $u_1.A_1 < \ldots < u_k.A1$ (where all tuples refer to the same entity) is said to contain a target point t if $\tau_S(u_1.A_1) \leq t \leq \tau_S(u_k.A_1)$]

In the households relation, for example, the time attribute $A_1$ is a tick number and the time between ticks is two days. Thus a window comprising tuples with tick numbers $u_1.A_1=1; u_2.A_1=2, \ldots u_{100}.A_1=100$ contains the target time t=199 days. The windows corresponding to different target time points can be processed independently in parallel, and the results merged to form the target time series. It is often the case, however, that a specified window W of source data points can be used to generate multiple target data points, and thus generating one copy of W per target point is wasteful. Based on this observation, in one embodiment the window paradigm is implemented by computing a sequence of fixed-size sliding windows over the source data points, where the windows advance one point at a time. For each window, one or more target time points can be computed. Because the sets of target points contained by consecutive windows may overlap, it is ensured that the data values for each target point are computed only once. Although sliding a window over the data may seem to be a sequential operation, it is possible, e.g., to generate Jaql code that will compute the sliding windows in a parallel map-reduce operation, with only a small amount of data transmitted between nodes.

Algorithm 1 and 2 are provided in FIGS. 12 (a) and (b) respectively. Algorithm 1 gives high-level pseudocode for the code-generation algorithm, which makes use of the timeAlignment subroutine in Algorithm 2. Note that the algorithm does not describe the details of how individual lines of code are generated. Such details depend strongly on the target programming language—Jaql, SQL, FORTRAN, and so on—and are relatively straightforward to implement, given the higher-order logic described by these algorithms.

The code generated by Algorithm 1 first sorts the source relation $S(A_1, \ldots A_k, \ldots, A_m)$ by its key in the sort order $A_2, \ldots, A_k, A_1$ (see line 14). For example, households will be sorted by (agentid, tick). Hence, the sorted source relation will be grouped according to the entity key agentid and tuples will appear in increasing time order for each entity. After this, each non-key attribute $A_j$ of S is assigned to exactly one of two categories, $G_1$ or $G_2$, according to the attribute's associated time alignment function $f(.,.; Aj)$; refer to lines 16-20. The first category $G_1$ corresponds to time-alignment functions such that a value at a target time point t can be computed from a window containing t that consists of precisely two consecutive source tuples. Time alignment functions such as linear interpolation and sum/average (with aggregation-since-start semantics), copy-from-last, and nearest neighbor fall under this category.

The second category $G_2$ corresponds to time-alignment functions such that a value at a target time point t can be computed from a window that consists of precisely of n consecutive source tuples, where $$\pi = \lceil \Delta_t/\Delta_s \rceil + 2$$

As will be discussed, sliding windows of this size have the property that any two consecutive target time points $t_{i-1}$ and $t_i$ are both contained in at least one of the windows. Time alignment functions such as sum or average (with aggregation-since-last semantics) fall under this category.

For example, the generated code divides the non-key attributes of households in the TAML specification in FIG. 9 into $G_1$ and $G_2$, where $G_1$ contains all the non-key attributes and $G_2$ is empty. The code divides the non-key attributes of stores into $G_1$ and $G_2$, where $G_2=\{numCustomers\}$ and $G_1$ consists of the remaining non-key attributes. After generating code to partition the attributes, Algorithm 1 invokes the timeAlignment function—given as Algorithm 2—to generate the code that will actually perform the time alignment to create a target relation comprising a regular time series with $\Delta T$ time units between ticks. For attributes in $G_1$, the window-size parameter n is fixed as 2, whereas the size of each window is set to $$\lceil \Delta_T/\Delta_S \rceil+2$$

for attributes in $G_2$. Algorithm 1 concludes by joining the relations corresponding to the disjoint attribute sets $G_1$ and $G_2$ to create the final target relation T.

The timeAlignment function given in Algorithm 2 makes use of a subroutine ExactSlidingWindowBySize (line 6) whose semantics are defined as follows. For an input sequence S of elements $e_1, \ldots, e_m$ and a window size n, it will return the sequence of windows $[e_1, \ldots, e_n], [e_2, \ldots, e_{n+1}], \ldots, [e_{m-n+1}, \ldots, e_m]$, where each window is exactly of size n.

Figure 11:
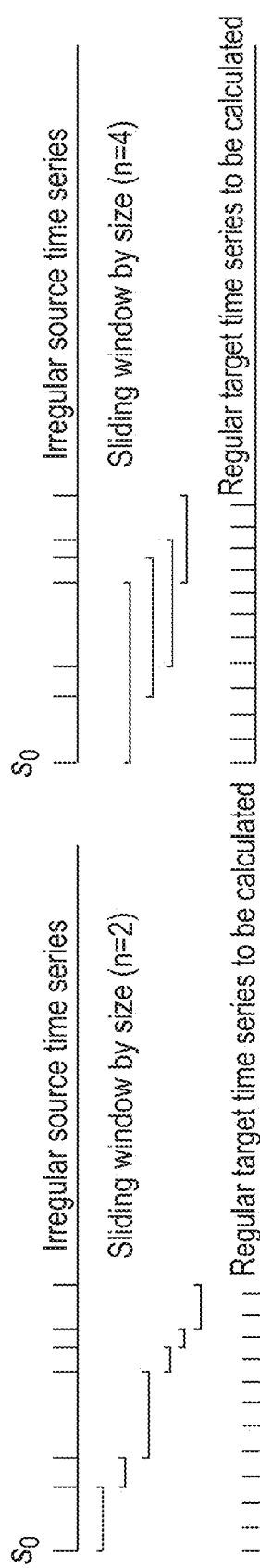
FIG. 11 depicts side by side examples of two different sequences of sliding windows for selecting points in a time series source in accordance to with one embodiment.

FIG. 11 shows two examples of the output of executing ExactSlidingWindowBySize over a source time series for window sizes of n=2 and n=4, respectively. The sequence of windows is illustrated as horizontal bars that "slide" over the (irregular) source time points. The window slides to the right by one element at a time and each window contains exactly two (resp. four) elements. The code generated by Algorithm 2 iterates over the sequence of windows returned by the function ExactSliding-WindowBySize(S, n). For windows that contain tuples corresponding to more than one entity—i.e., the window contains tuples with distinct values of $(A_2, \ldots A_{ki})$—the window is discarded (lines 7-9). For example, consider the following sorted relation S(agentid, tick,numCustomers) with a simplified schema and four tuples t1: 10, 1, 200
t2: 10, 2, 205
t3: 11, 1, 90
t4: 11, 2, 98

A call to ExactSlidingWindowBySize(S, 2) will return three windows [t1, t2]; [t2, t3]; [t3, t4]. The second window [t2, t3] will be discarded by lines 7-9 because t2.agentid is not equal to t3.agentid. The rest of the algorithm (lines 10-40) generates code to compute, for the current window w, the target values for the attributes in G, as follows. First, the leftmost and rightmost target ticks within w, called l and r, are computed (lines 13 and 14). If G is of type $G_1$ (lines 15-24), the values of each attribute in G are computed as follows. If w is the first window of the sequence or t, does not coincide with the smallest source time point of w, values of attributes in G are generated for target time ticks that range from l to r; otherwise, the values of attributes in G are generated for target time ticks in the range l+1 to r. For the latter case, the values of attributes in G at target time tick l are not generated because they have already been calculated when the window just prior to w was processed. By avoiding duplicate computations, the generated code avoids creation of duplicate tuples in the target relation, and hence avoids the need to invoke an expensive duplicate-removal step at the end.

Lines 25-40 generate code to handle the case in which G is of the second type $G_2$. The process of computing the target values of attributes in G is similar to what was described for the case $G_1$. For the first window, target values of attributes in G are computed in the tick range of 1 to r. If the first target time point $t_0=0$ coincides with the first source time point $s_0$, then the target values at $t_0$ are simply copied from the source values at $s_0=t_0$ (lines 33-35). From the second window onwards, target-value computations begin with the leftmost target time point contained in the subwindow given by the last two source tuples in w, namely, w[n−2] and w[n−1] (line 30). This is because the previous window overlaps with w from w[0] to w[n−2] and therefore, the values of attributes in G for target time points contained in the subwindow given by w[0] to w[n−2] have already been calculated. When the window size is n=4, for example, every window except the first shares three source points with the previous window.

Some error correction accounts should also be discussed. The sequence of windows generated as described in lines 6-9 of Algorithm 2 is sufficient for computing attribute values at every target time point. For attributes that belong to $G_1$, the algorithm uses a sliding window of size 2 is used. Since it is assumed that the target time points are bracketed by the minimum and maximum source time points (line 9 of Algorithm 1), every target time point $t_i$ must be contained in some window w of size 2 over the source relation, where w does not span two distinct groups. Hence, the target values at $t_i$ for attributes in $G_1$ are computed when the first such non-spanning window is processed. Furthermore, windows that span two distinct groups (lines 7-9 of Algorithm 2) can be discarded without affecting correctness.

For attributes that belong to $G_2$, the algorithm uses sliding windows of size $$\lceil \Delta_T/\Delta_S \rceil+2.$$

If the attribute values for target time $t_i$ are to be calculated from the source tuples in a window w, then $t_{i-1}$ must also be contained in w. It is easily seen that the interval $[t_{i-1}, t_i]$ contains at most $\lceil \Delta_T/\Delta_S \rceil$ source time points. The algorithm provides uses a window size of $\lceil \Delta_T/\Delta_S \rceil+2$. and hence provides an extra source time point both before $t_i-1$ and after $t_i$, which ensures the existence of at least one sliding window that contains both $t_i-1$ and $t_i$. Furthermore, since it is assumed that the size of each group exceeds $\lceil \Delta_T/\Delta_S \rceil+2$. (line 10 of Algorithm 1), then there is at least one sliding window that contains both $t_i-1$ and $t_i$ and does not span more than one distinct group. The target attribute values at $t_i$ are computed when the first such window is processed. As before, windows that span more than one distinct group can be safely discarded in lines 7-9.

The algorithm has been described for the case where $t_0=0$ and the following bracketing conditions hold:

$$s_0 \leq t_0 < s_1 \text{ and } s_{n_s-1} < t_{n_t} \leq s_{n_s}$$

As is appreciated by one skilled in the art, there is no loss in generality in assuming that $t_0=0$, since if when it is not zero, the time axis can be shifted. That is, the algorithm is modified to transform each source time point $s_i$ and target time point $t_j$ to $s_i-t_0$ and $t_j-t_0$, respectively, in its calculations. In a similar way, the algorithm can be modified to handle situations where the bracketing condition does not hold, and hence there are insufficient source data points at the boundaries of the target time point sequence. As discussed previously, the two standard approaches to deal with this situation are to impose exact or periodic boundary conditions. In a preferred embodiment in which the SADL description captures an additional field that specifies the maximum target time point that needs to be generated, exact boundary conditions can be implemented as follows: The existing algorithm can be used as is to generate values for target time points whenever possible. Subsequently, for target time points where the associated values cannot be generated, missing values are used to represent the associated values. The missing values to be used for each attribute are specified in the TAML file (see the missing-data keys in FIG. 9). Recall that periodic boundary conditions handle missing values by having the window "wrap around" to use source data points at the beginning (or end) of a time series, and hence the name "periodic". A preferred embodiment only allows periodic boundary condition when the source time series is regular, because it is unnatural to assume that source data will be placed in the same irregular manner periodically. To implement periodic boundary condition, an additional field in a source-data SADL file that specifies whether a source time series is regular or irregular can be used. A preprocessing step is made to wrap data around at the beginning (or end) of a time series so that there are sufficient source time points that completely span the required sequence of target time points. Data needs to be cumulated accordingly when wrapping data around using aggregation-since-start semantics. After this, the algorithm described earlier in this section can be used as-is to compute the time-aligned target dataset.

Figure 13:
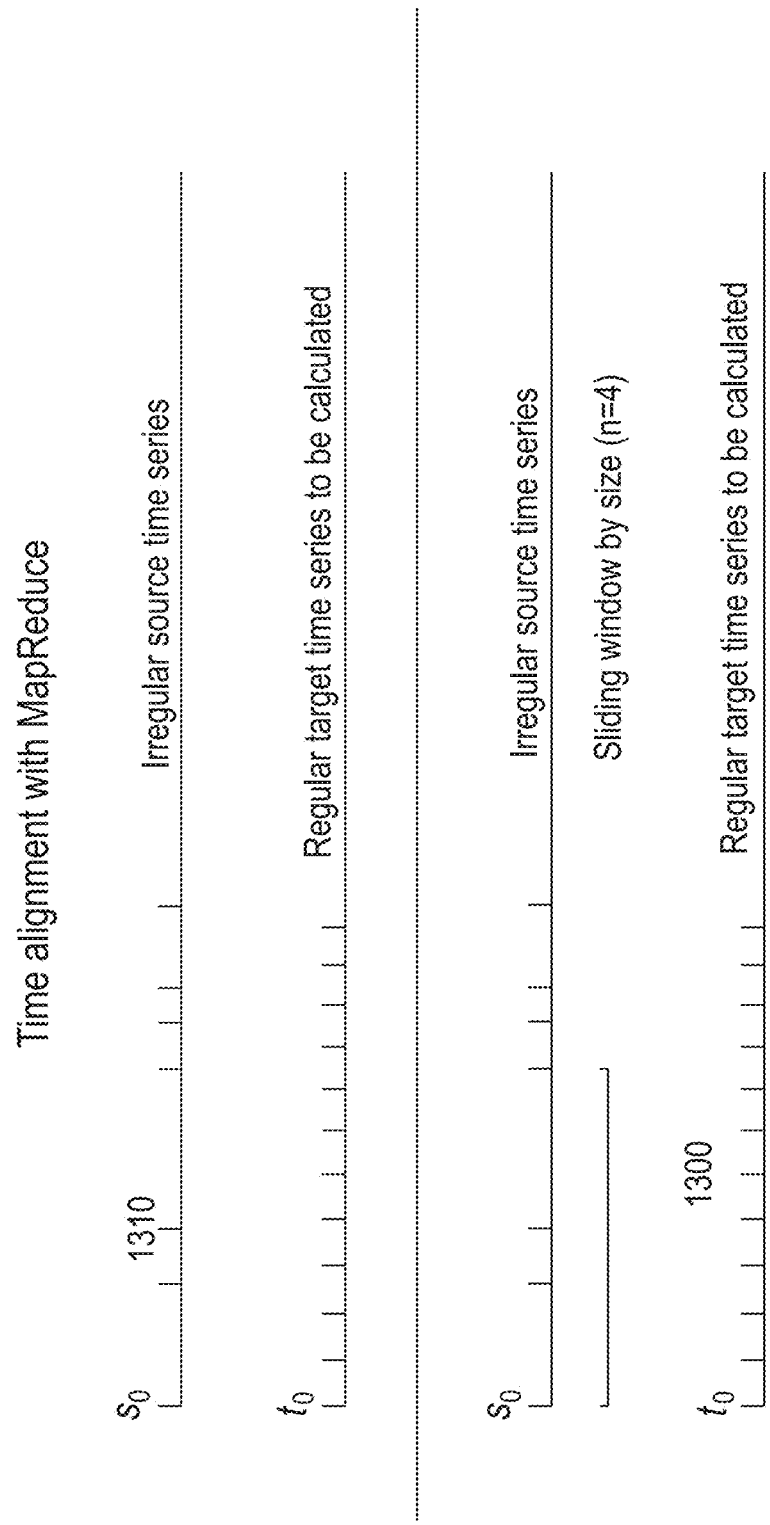
FIGS. 13 through 20 depict a data series window progressing through time.
Figure 14:
Figure 15:
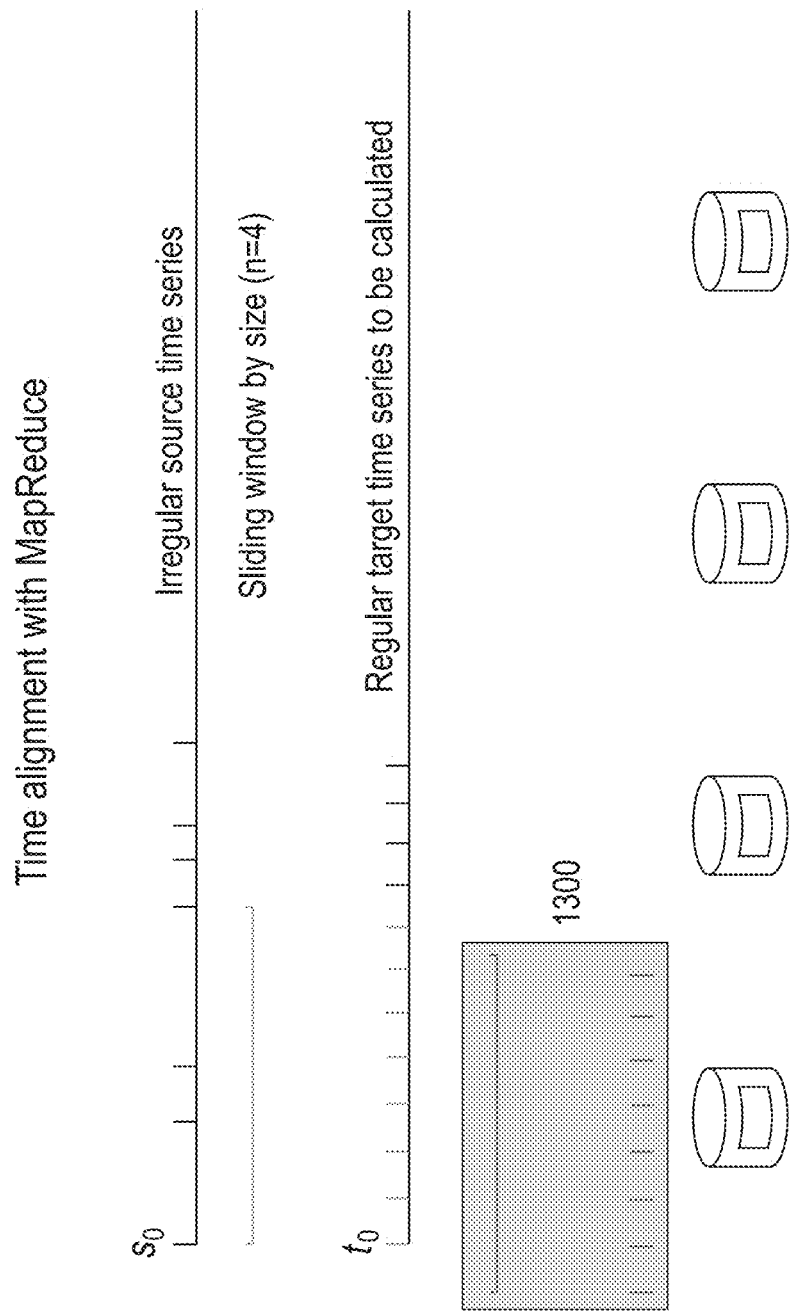
Figure 16:
Figure 17:
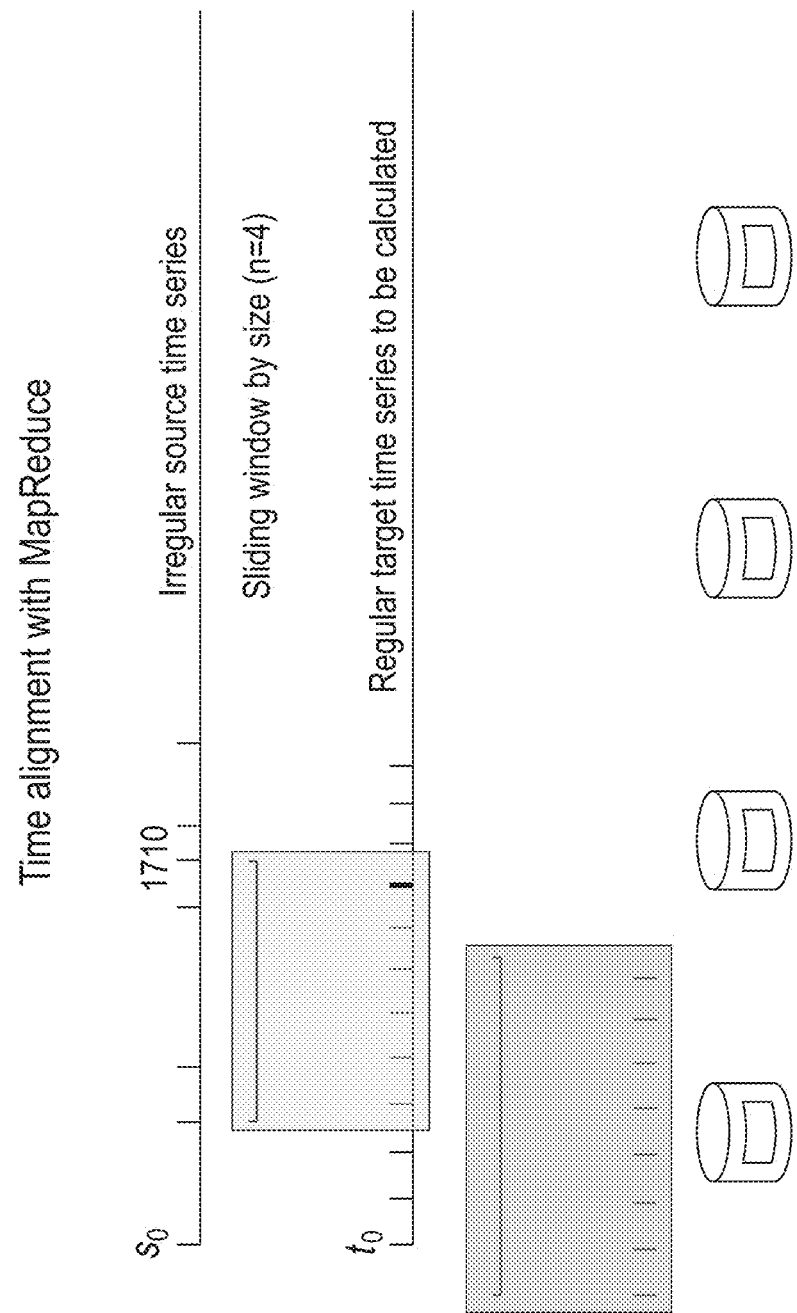
Figure 18:
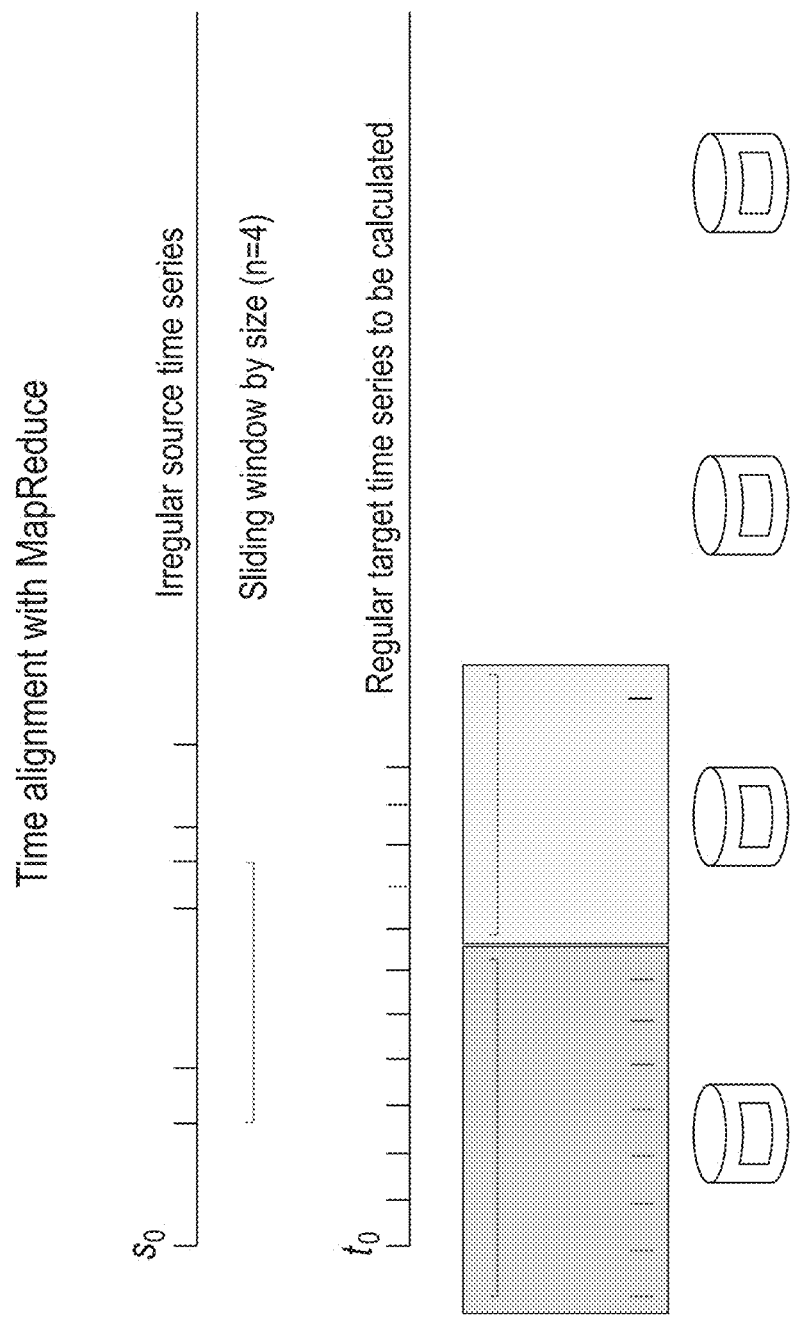
Figure 19:
Figure 20:
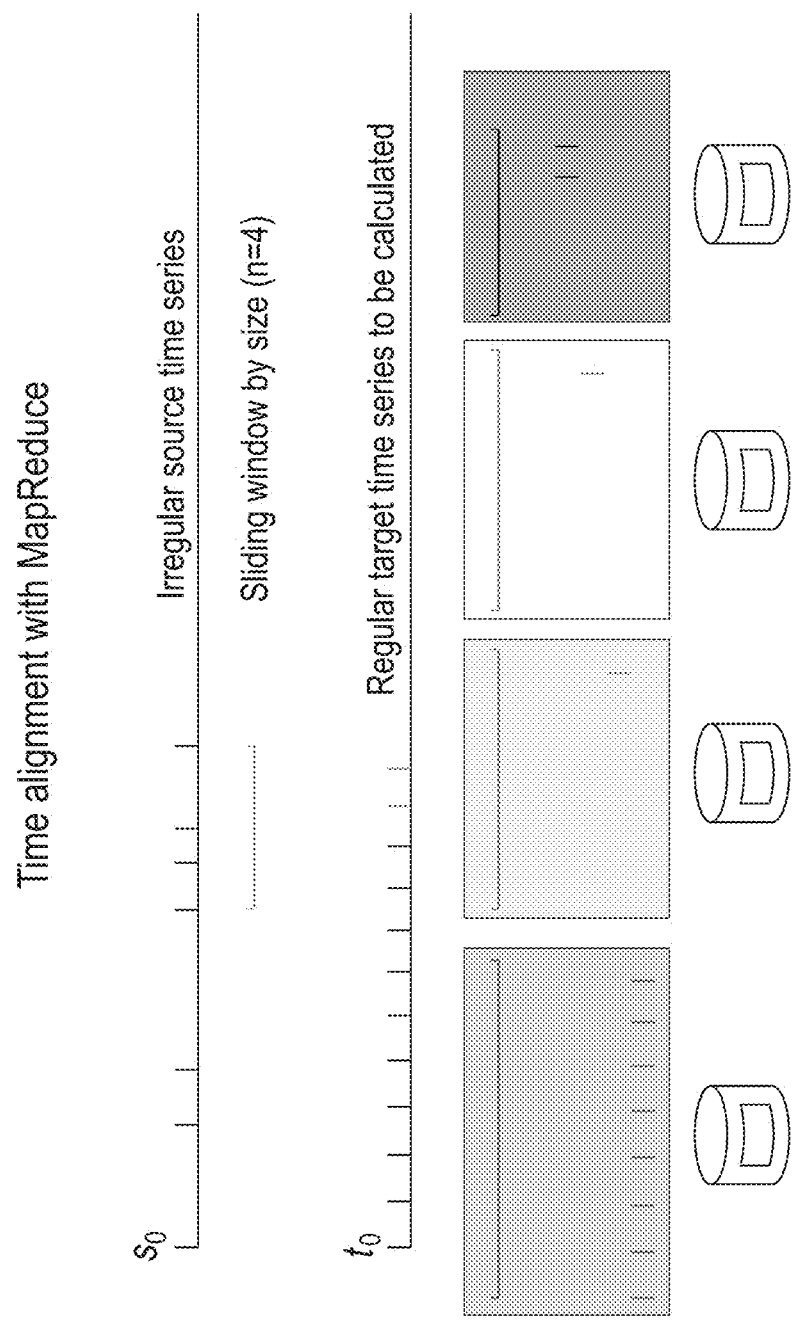

FIGS. 13 through 20 provide a graphical illustration of a time alignment scenario provided using MapReduce according to one embodiment. In FIG. 13, a sliding window 1300 is established having time ticks 1310 in an irregular series. In this embodiment as shown in FIGS. 14 and 15, the top graph provides for a sliding window with a size of 4 irregular time ticks that progresses. The irregular time series and ticks will be converted to regular time ticks as illustrated in the bottom graph throughout these figures. In FIG. 17, the window has moved across a time line and new time tick 1710 has been added as can be observed. In FIGS. 18, 19 and 20 as the window progresses in time, additional and new time ticks have been added. In one embodiment, the metadata can include a plurality of time tick indicators—both for regular and irregular time ticks as well as time unit information and measurement methods. A minimum interval can also be specified between any two successive time ticks. In one embodiment, converting between time domains can be done selectively by user interactions. In such embodiments, a menu of appropriate time-alignment transformations can be provided to a user for a plurality of data attributes. The moving window described above can then be used in the manner discussed such as over time ticks, with an associated transformation function over data in the window.

The present invention has been described for embodiments in which the time-alignment transformations are generated for the purpose of allowing a second simulation model to use as input the data provided by a first simulation model. As is appreciated by one skilled in the art, the invention can be applied in any situation in which a source time-series dataset must be transformed to a target time scale, e.g. in a data warehousing scenario, and there is appropriate metadata describing the source and time-series datasets. Similarly, the invention can be applied in situations in which role of the "time points" is played by a sequence of points along some other one-dimensional axis. For example, a point $t_i$ might refer not to a time, but rather to a distance from a defined origin point.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and software.

What is claimed is:

1. A computer implemented method, comprising:
   receiving a specification request for generating a set of target time-series data from a set of source time-series data, the set of source time-series data defined by a plurality of time ticks;
   obtaining source specification information relating to the set of source time-series data, obtaining target specification information relating to the set of target time-series data, and obtaining the source time-series data;
   determining that a time alignment is needed to align the source time-series data to the target time-series data by comparing the source specification information to the target specification information to determine that the set of source time-series data are not time-aligned with the set of target time-series data; and
   upon determining that the time alignment is needed, providing a menu of time-alignment transformations to a user for a plurality of data attributes;
   receiving, from the user, a selection of a set of time-alignment transformations, wherein each time-alignment transformation in the set of time-alignment transformations corresponds to a respective data attribute of the plurality of data attributes and specifies a time-alignment method to be applied to the respective data attribute;
   converting the set of source time-series data to the set of target time-series data by executing the selected set of time-alignment transformations, wherein converting comprises:
     defining a sequence of fixed size sliding windows over the plurality of time ticks defined by the set of source time-series data, wherein each fixed size sliding window advances one tick at a time over the set of source time-series data;
     processing the sequence of fixed size sliding windows by determining, for each fixed size sliding window, a respective set of data values, wherein each data value corresponds to a respective target time point bounded by the fixed size sliding window, and wherein at least two fixed size sliding windows are processed in parallel; and
     merging each respective set of data values to obtain the set of target time-series data.

2. The method of claim 1, the converting further comprising determining a plurality of data processing sub-sequences that enable the at least two fixed size sliding windows to be processed in parallel.

3. The method of claim 1, wherein the source specification information comprises first metadata associated with the set of source time-series data and the target specification information comprises second metadata associated with the set of target time series data.

4. The method of claim 3, wherein the first metadata includes a first plurality of time-series descriptors associated with the set of source time-series data and the second metadata comprises a second plurality of time-series descriptors associated with the set of target time-series data.

5. The method of claim 4, wherein the plurality of time ticks is a first plurality of time ticks, and wherein the second plurality of time-series descriptors indicate that a second plurality of time ticks defined by the set of target time-series data occur at regular time intervals.

6. The method of claim 4, wherein the first plurality of time-series descriptors indicate that the plurality of time ticks defined by the set of source time-series data occur at irregular time intervals.

7. The method of claim 4, wherein the first metadata comprises a first set of values corresponding to a set of time attributes and the second metadata comprises a second set of values corresponding to the set of time attributes.

8. The method of claim 7, wherein determining that the time alignment is needed comprises determining that a first value in the first set of values is incompatible with a second value in the second set of values, wherein the first value and the second value each relate to a same time attribute in the set of time attributes.

9. The method of claim 4, determining, based at least in part on the first plurality of time-series descriptors, a minimum interval between any two successive time ticks of the plurality of time ticks defined by the set of source time-series data.

10. The method of claim 1, wherein the converting is performed automatically upon determining that the time alignment is needed, the method further comprising generating computer code to execute the selected set of time-alignment transformations.

11. The computer implemented method of claim 1, wherein the sequence of fixed size sliding windows comprises a first fixed size sliding window and a second fixed size sliding window that each bound a same target time point, and wherein the data value corresponding to the same target time point is computed only once.

12. A computer program product comprising a non-transitory computer readable storage medium having computer readable program code embodied therewith, said computer readable program code being executable by a processor to perform a method comprising:

receiving a specification request for generating a set of target time-series data from a set of source time-series data, the set of source time-series data defined by a plurality of time ticks;

obtaining source specification information relating to the set of source time-series data, obtaining target specification information relating to the set of target time-series data, and obtaining the source time-series data;

determining that a time alignment is needed to align the source time-series data to the target time-series data by comparing the source specification information to the target specification information to determine that the set of source time-series data are not time-aligned with the set of target time-series data; and upon determining that the time alignment is needed, providing a menu of time-alignment transformations to a user for a plurality of data attributes;

receiving, from the user, a selection of a set of time-alignment transformations, wherein each time-alignment transformation in the set of time-alignment transformations corresponds to a respective data attribute of the plurality of data attributes and specifies a time-alignment method to be applied to the respective data attribute;

converting the set of source time-series data to the set of target time-series data by executing the selected set of time-alignment transformations, wherein converting comprises:

defining a sequence of fixed size sliding windows over the plurality of time ticks defined by the set of source time-series data, wherein each fixed size sliding advances one tick at a time over the set of source time-series data;

processing the sequence of fixed size sliding windows by determining, for each fixed size sliding window, a respective set of data values, wherein each data value corresponds to a respective target time point bounded by the fixed size sliding window, and wherein at least two fixed size sliding windows are processed in parallel; and merging each respective set of data values to obtain the set of target time-series data.

13. The program product of claim 12, the method further comprising automatically generating computer code to execute the selected set of time-alignment transformations.

14. The program product of claim 13, the converting further comprising determining a plurality of data processing sub-sequences that enable the at least two fixed size sliding windows to be processed in parallel.

* * * * *